(12) United States Patent
Ikeyama

(10) Patent No.: US 7,068,310 B1
(45) Date of Patent: Jun. 27, 2006

(54) IMAGING DEVICE

(75) Inventor: Hiromasa Ikeyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/545,203

(22) Filed: Apr. 7, 2000

Related U.S. Application Data

(63) Continuation of application No. PCT/JP99/04340, filed on Aug. 11, 1999.

(30) Foreign Application Priority Data

Aug. 11, 1998 (JP) .................................. 10-227390

(51) Int. Cl.
*H04N 5/262* (2006.01)
*H04N 5/76* (2006.01)
*H04N 5/225* (2006.01)

(52) U.S. Cl. ............... 348/239; 348/231.9; 348/207.99

(58) Field of Classification Search ........... 348/231.99, 348/231.9, 240.99, 240.1, 240.2, 333.11, 348/239, 207.99; 386/1, 46, 117; 382/298, 382/299, 300
See application file for complete search history.

(56) References Cited

U.S. PATENT DOCUMENTS 5,301,266 A * 4/1994 Kimura ....................... 345/660
5,463,419 A * 10/1995 Saito ......................... 348/231.9
5,617,155 A * 4/1997 Ducarouge et al. ......... 351/204
5,734,427 A * 3/1998 Hayashi .................. 348/333.11
6,295,087 B1 * 9/2001 Nohda ......................... 348/234
6,618,082 B1 * 9/2003 Hayashi et al. ......... 348/231.99
6,762,792 B1 * 7/2004 Matsumura .............. 348/240.2

FOREIGN PATENT DOCUMENTS

| JP | 2-274547 | 11/1990 |
| JP | 9-307401 | 11/1997 |
| JP | 10-191392 | 7/1998 |
| JP | 10-319898 | 12/1998 |

* cited by examiner

*Primary Examiner*—Wendy R. Garber
*Assistant Examiner*—Luong T. Nguyen
(74) *Attorney, Agent, or Firm*—Frommer Lawrence & Haug LLP; William S. Frommer; Samuel S. Lee

(57) ABSTRACT

An imaging device for receiving an input image and producing two size-adjusted output images. The imaging device includes a detector that captures the input image and outputs the captured input image as image data; a first adjuster for performing image size adjustment using a linear interpolation on the image data to produce a first output image that is displayed and outputted; a second adjuster for performing image size adjustment using a curve interpolation on the image data to produce a second output image that is recorded on a recording medium.

8 Claims, 25 Drawing Sheets

AN EXAMPLE OF REDUCING INPUT SIGNALS TO 3/4 (M=4, N=3) (CURVE INTERPOLATION)

HORIZONAL THINNING-OUT TIMING OF Y-HORIZONTAL FILTER

FIG. 15 HORIZONTAL THINNING-OUT TIMING OF C-HORIZONTAL FILTER

OUTPUT TIMING OF Y-, C-HOLIZONTAL FILTERS

FIG. 17 OUTPUT TIMING OF Y-, C-VERTICAL FILTERS

41CH (C-HORIZONTAL FILTER)

IMAGING DEVICE

This is a continuation of copending International Application PCT/JP99/04340 having an international filing date of 11 Aug. 1999.

TECHNICAL FIELD

This invention is related to an imaging device, and for example, is suitably applied to an imaging device which takes image data in a digital still camera with photoelectric converting elements, records this in a recording medium as photographed image data, and then outputs and displays this on a display unit.

BACKGROUND ART

Heretofore, a so-called electronic camera (digital still camera) using CCD (Charge Coupled Device) secondary solid image pickup elements has been known. This kind of digital still camera memorizes image data of a still image, which is taken in with the CCD secondary solid image pickup elements, in a recording medium such as a memory card, a magnetic disk, and a magneto-optical disc, as photographed image data. Therefore, a film which is used in a normal camera is unnecessary.

For example, the digital still camera can output and reproduce the image of an object, which is taken in with the CCD secondary solid image pickup elements at the time of photographing, on a viewfinder. Then, a user confirms the image on the viewfinder and pushes the shutter, so that the image data, which is being taken in at this time, can be recorded in a recording medium as a photographed image.

In addition, the digital still camera can output and reproduce the image data, which has been recorded in the recording medium, on the viewfinder and also can output it to an external television monitor or a computer so as to display it like a photographed picture.

However, such a digital still camera may record image data for one frame (one image) taken in with CCD secondary solid image pickup elements, for example, in a recording medium such as a memory card, leaving its size (the number of picture elements) as it is. However, if there is a problem in the capacity of a recording medium or there is a request to increase the number of pictures to be photographed, the image size adjusting processing, such as compression of taken image data, is executed.

In addition, the digital still camera performs the image size adjusting processing on image data to be displayed, either in the case where there is a problem in the number of picture elements of the display screen or where images are magnified and displayed or are reduced and displayed on the monitor.

However, in the digital still camera, when the image size adjusting processing is performed on image data to be recorded, merely thinning out picture elements of the image data for the image size adjustment leads to a problem in that image quality becomes significantly worse owing to increase of aliasing.

In addition, in the digital still camera, it can be considered in which a high-dimensional filter is used to avoid the deterioration of image quality. However, this consideration has a problem in that the size of a hardware becomes large.

DISCLOSURE OF INVENTION

The present invention has been made in view of the aforementioned problems, and is intended to provide an imaging device which can suitably perform image size adjusting processing on image data to be displayed and image size adjusting processing on image data to be recorded without enlarging the size of a hardware.

To solve such problems, the imaging device comprises a photographing means for outputting photographed image as image data, a size-of-image-to-be-displayed adjusting means for performing image size adjusting processing on the image data outputted from the photographing means by a linear interpolation to produce image data to be outputted and displayed, a size-of-image-to-be-recorded adjusting means for performing image size adjusting processing on the image data outputted from the photographing means by a curve interpolation to produce image data to be recorded in a recording medium, a display data output means for executing an output operation for display to the image data of which the size has been adjusted by the size-of-image-to-be-displayed adjusting means, and a recording means for recording the image data of which the size has been adjusted by the size-of-image-to-be-recorded adjusting means in a recording medium.

Therefore, as for image data to be recorded, the image size adjusting processing using the curve interpolation is executed by the size-of-image-to-be-recorded adjusting means to prevent the deterioration of image quality and to record image data in a recording medium with high quality. In addition, as for image data to be displayed, the image size adjusting processing using the size-of-image-to-be-displayed adjusting means which performs the linear interpolation with a simple construction is executed, thereby it can easily cope with the change of conversion ratio and also can cope with display operations such as magnification display and reduction display and moreover, can cope with the type of viewfinder and of monitor which is connected externally.

Further, in the size-of-image-to-be-recorded adjusting means and the size-of-image-to-be-displayed adjusting means, a line memory for the image size adjusting processing is shared and therefore, a comparatively large size of a line memory can be effectively used. Thus, the increase of the size of hardware in the imaging device can be retained to the minimum.

Further, in the curve interpolation of the size-of-image-to-be-recorded adjusting means, in the case of interpolating image data into N/M (Here, M and N are mutually prime and positive numbers. That is, N/M can not be reduced.), filtering in which the points of n/M and k/M on a frequency axis are zero is performed, so that the deterioration of image quality can be satisfactorily prevented. Thus, it is suitable for retaining the image quality of record data.

BEST MODE FOR CARRYING OUT THE INVENTION

Figure 1:
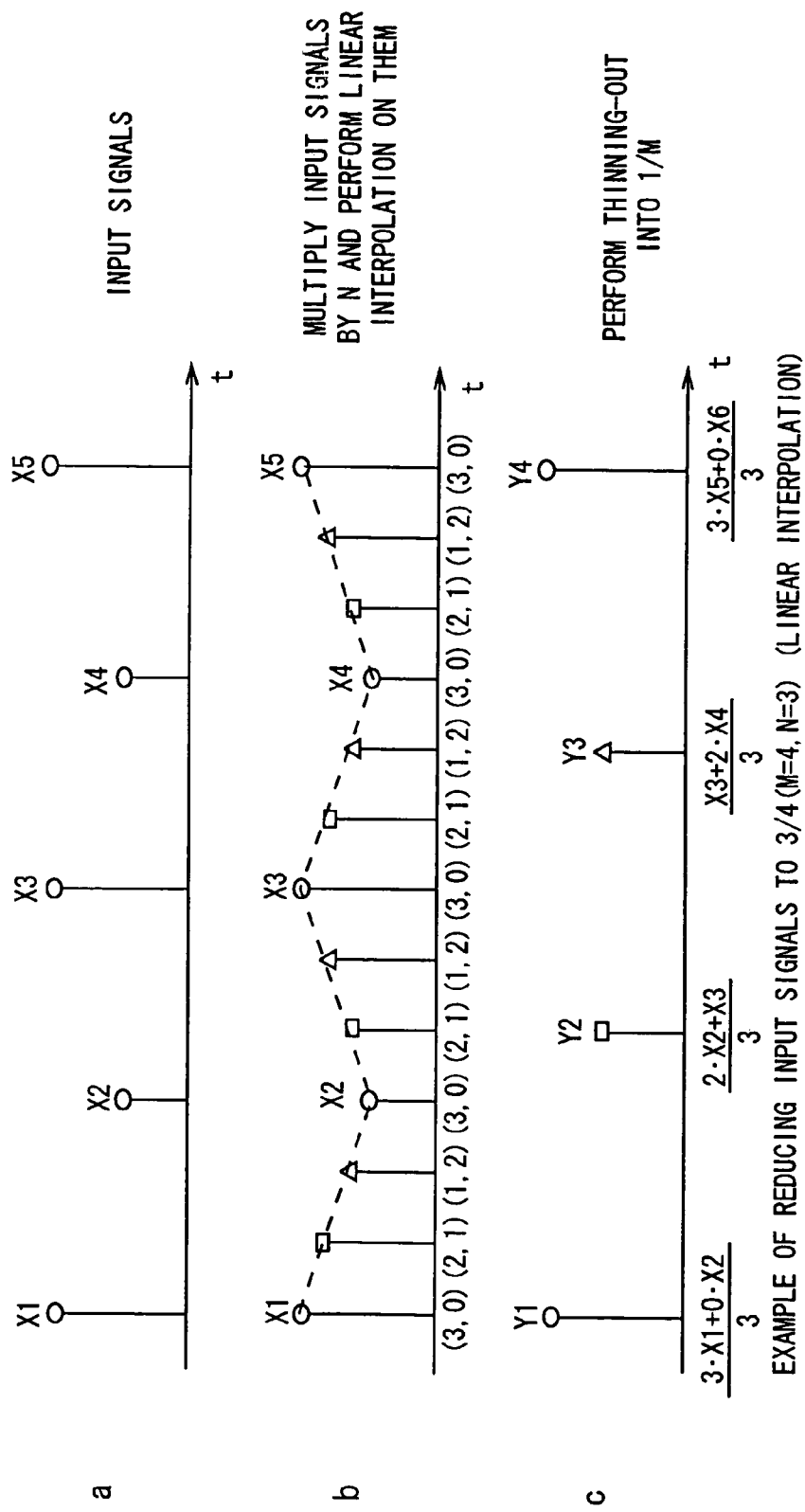
FIG. 1 is a schematic diagram used for explaining the principle of a linear interpolation.

Hereinafter, an embodiment of the present invention will be described with reference to the drawings. Here, a digital still camera will be described as an imaging device of the present invention in the following order.

1. linear interpolation and curve interpolation
2. circuit structure of the digital still camera
3. size-of-image-to-be-recorded adjuster
4. size-of-image-to-be-displayed adjuster 1. Linear Interpolation and Curve Interpolation In a digital still camera according to the present invention, a size-of-image-to-be-displayed adjuster 9, which will be described later, adjusts the size of image by the linear interpolation, and a size-of-image-to-be-recorded adjuster 10 adjusts the size of image by the curve interpolation. At first, filtering working as the linear interpolation and the curve interpolation will be described.

Figure 2:
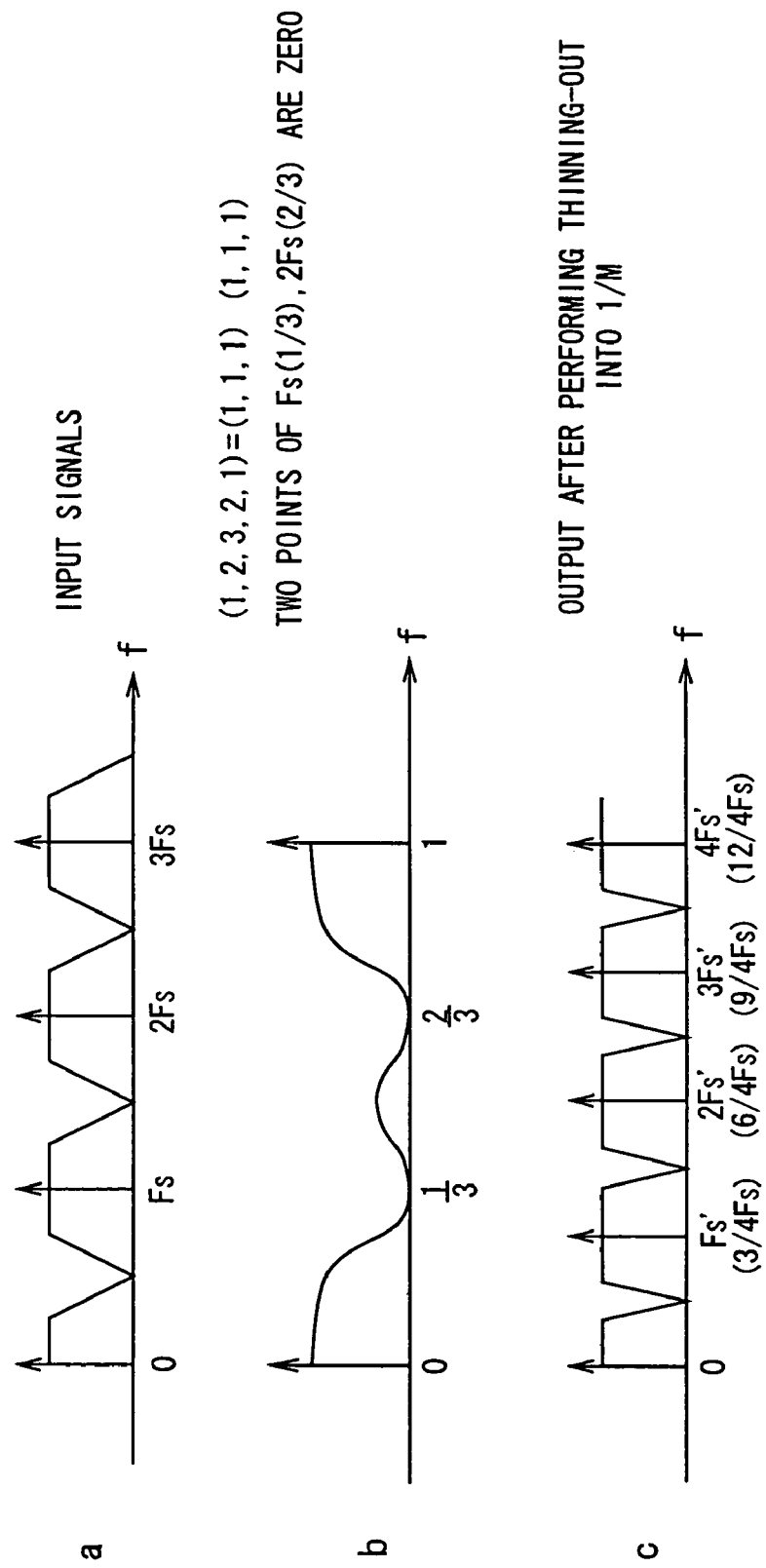
FIG. 2 is a schematic diagram used for explaining the frequency characteristics in the linear interpolation.

Firstly, the principle of the linear interpolation will be described with reference to FIGS. 1 and 2. Here, as the case of compressing input data Xn (n=1,2, . . . ) into N/M, the case of letting M=4 and N=3, that is, the case of compressing input data Xn into ¾ will be explained.

FIG. 1a shows input data X1, X2, . . . which are sampled with a fixed sampling frequency Fs and then are inputted with a clock rate having the frequency. From the component viewpoint of frequency, the input data has a characteristic in which it repeats with the sampling frequency Fs as a unit, as shown in FIG. 2a.

Reducing such the input data Xn into 3/4 (N/M) by the linear interpolation is equal to a method of setting sample points of input data (picture element data) to threefold (N-fold) so that a clock rate becomes the least common multiple of N and M, obtaining corresponding data (□ and △) based on the distance rate of input data Xn at each sample point, and thinning out the input data into 1/4 (1/M) as shown in FIG. 1C.

Further, in FIG. 1b, a numeral showed below each sample point shows the distance rate with respect to input data (Xn and Xn+1) at both sides of the sampling point, and this distance rate can be treated as a filter coefficient.

Next, in FIG. 1C, the data Y1, Y2, . . . which has been reduced into ¾ will be considered. At first, the data Y1 has the distance rate (3,0) with respect to the input data X1, X2 of FIG. 1b, so that Y1=(3·X1+0·X2)/3. Similarly, from the distance rate with respect to the input data Xn, the data Y2, Y3, Y4 can be obtained as follows:

$Y2=(2·X2+0·X3)/3$ $Y3=(1·X3+2·X4)/3$ $Y4=(3·X5+0·X6)/3$

That is, this linear interpolation is equal to a method of inserting 0 data into positions which become sample points for threefold and performing the digital filtering of (1,1,1) (1,1,1)=(1,2,3,2,1).

From the frequency characteristic viewpoint, the points corresponding to Fs, 2Fs of the case where the sampling frequency 3Fs is taken to be "1" and is normalized, that is, two points ⅓, ⅔ are zero, as shown in FIG. 2b.

Further, the output data Y1, Y2, . . . , which have been thinned out into 1/M, have a characteristic in which they repeats with (¾)Fs as a unit as shown in FIG. 2c. As can be seen from the above explanation, in the case of considering the linear interpolation of N/M as the filter characteristics, the filter is the one in which k/N(k=1, 2, . . . , N−1)-fold points of the sampling frequency Fs of input data are zero, and "M" has no connection with this filter characteristic.

For this reason, if the conversion ratio of N/M is apart from one, that is, if the reduction ratio becomes large, aliasing which occurs by 1/M re-sampling is not decreased but image quality significantly becomes worse in the case of image data.

Figure 3:
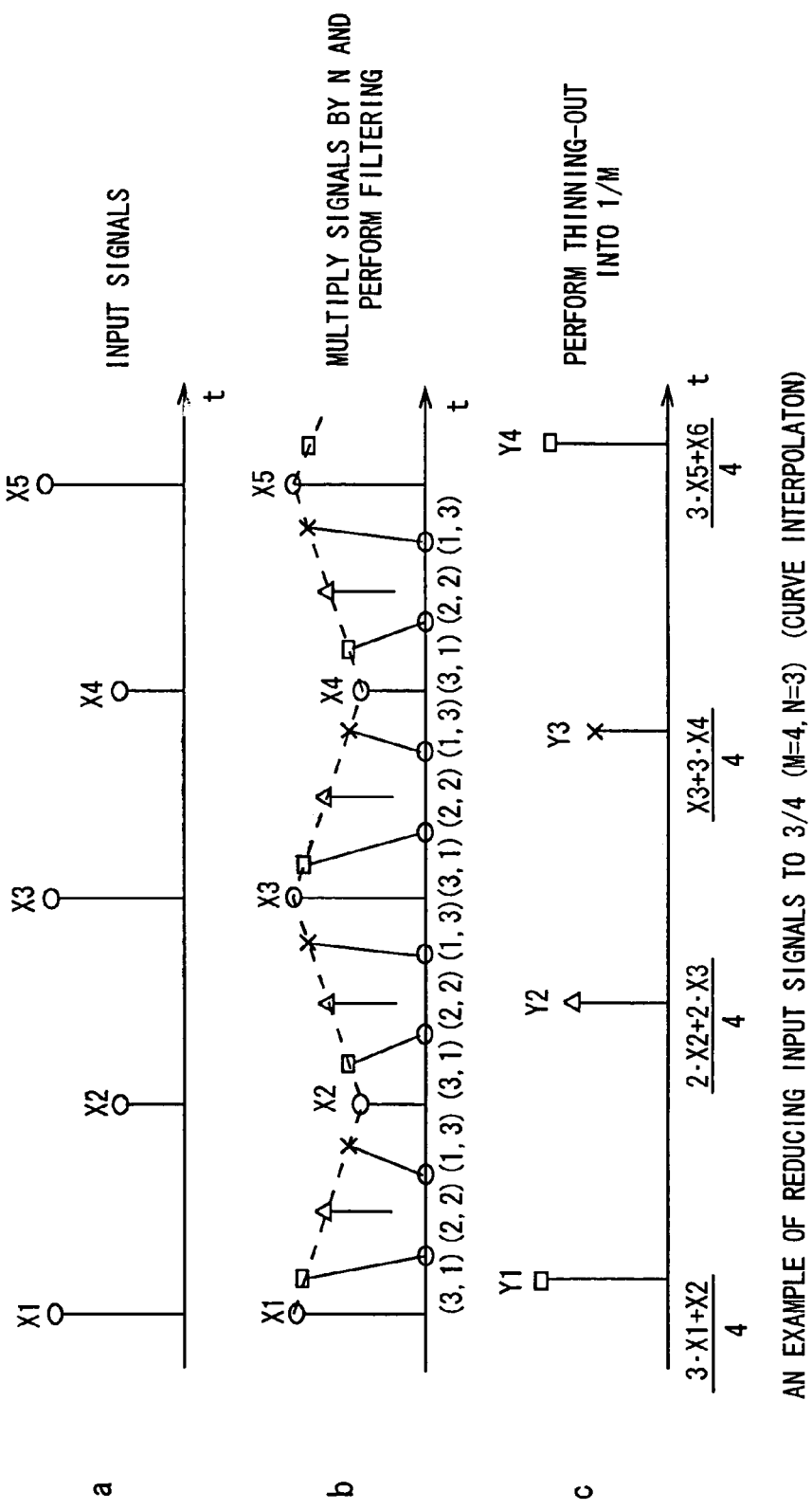
FIG. 3 is a schematic diagram used for explaining a curve interpolation.
Figure 4:
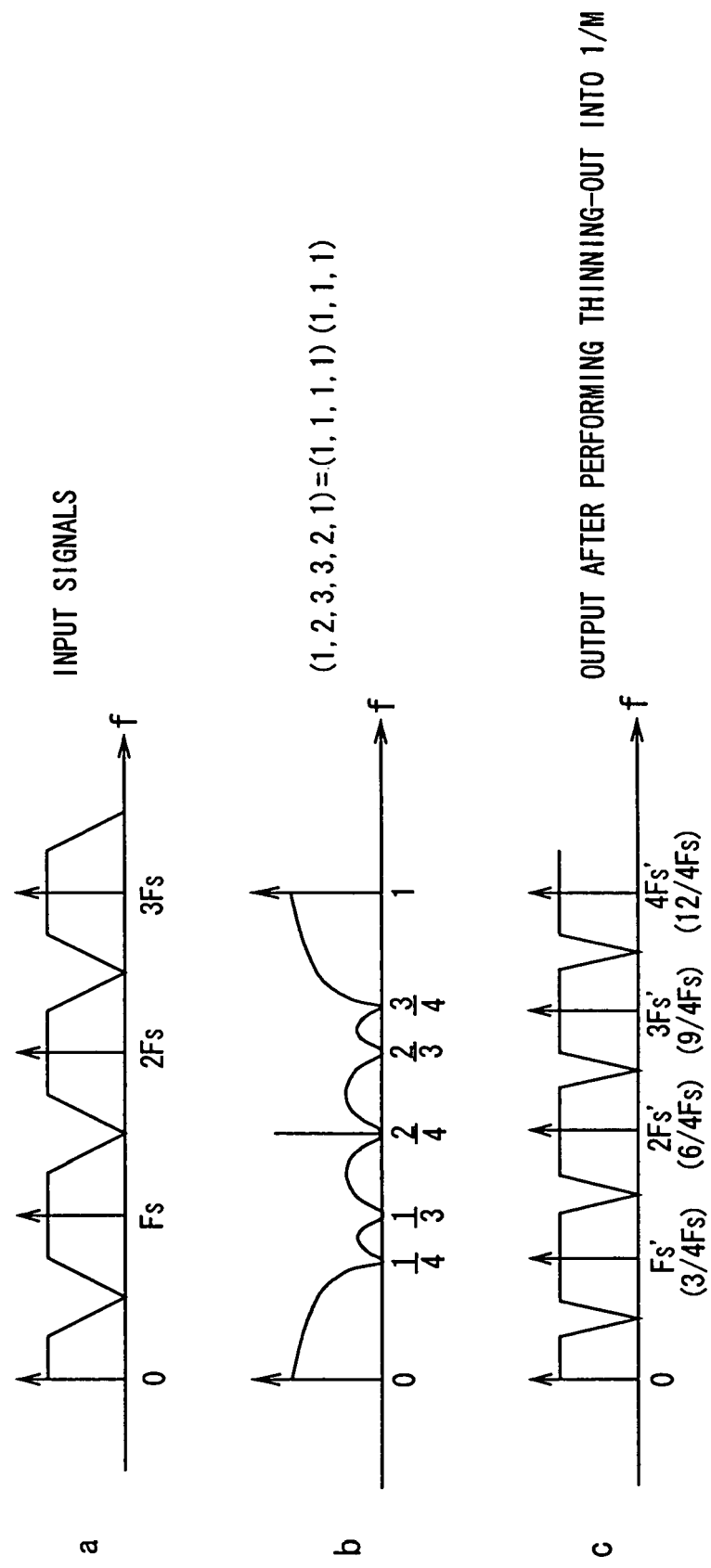
FIG. 4 is a schematic diagram used for the frequency characteristics in the curve interpolation.

Next, the principle of the curve interpolation will be explained with reference to FIGS. 3 and 4. Similarly, as the case of converting input data Xn (n=1, 2, . . . ) into N/M, an example of M=4 and N=3, that is, an example of compressing input data Xn into 3/4 will be explained.

In this case, input data is sampled at a fixed sampling frequency Fs as shown in FIG. 3a. And as for input data X1, X2, . . . which are input at the clock rate having the frequency, as shown in FIG. 3b, N-fold (threefold) data which is generated by inserting zero data is subjected to filtering so that k/N-fold (k=1, 2, . . . , N−1) and n/M-fold (n=1, 2, . . . , M−1) frequency points of the sampling frequency Fs are zero.

Then, input data is thinned out into 1/M as shown in FIG. 3c, and the distance rates shown in FIG. 3b can be used as filter coefficients, the followings are obtained:

$Y1=(3 \cdot X1+1 \cdot X2)/4$ $Y2=(2 \cdot X2+2 \cdot X3)/4$ $Y3=(1 \cdot X3+3 \cdot X4)/4$ $Y4=(3 \cdot X5+1 \cdot X6)/4$ That is, the case of M=4 and N=3 is equal to the case of performing digital sampling of (1,1,1,1)(1,1,1)=(1,2,3,3,2,1).

Relative to the characteristic of input data Xn which repeat with a sampling frequency Fs as a unit as shown in FIG. 4a and output data Yn in FIG. 4c, the frequency characteristic is the filtering characteristics in which k/N (k=1, 2, . . . , N−1)-fold and n/M (n=1, 2, . . . , M−1)-fold frequency points in the case of taking the sampling frequency 3Fs as "1" and performing normalization are zero as shown in FIG. 4b.

This is, the filter characteristic is the one in which the carrier components of input data in FIG. 4a are suppressed and the frequency components which become carriers after data is thinned out into 1/M as shown in FIG. 4c are also suppressed. Therefore, even if the values of N and M are set to any numbers (conversion ratio is set to any ratio), aliasing can be decreased and deterioration of image quality can be also suppressed because of decreasing the visual remarkable changes into low frequency (aliasing) from the image data viewpoint.

As described above, a filter of the case of performing interpolation into N/M by the linear interpolation or by the curve interpolation is as follows. Firstly, the linear interpolation is expressed by the following equation (1).

$$\left[\sum_{k=0}^{N-1} Z^{-k}\right]^2 \quad (1)$$

And, in the case of N=3, this equation is equal to $(1+Z^{-1}+Z^{-2})^2=(1,1,1)(1,1,1)=(1,2,3,2,1)$ as described in the aforementioned example.

Further, the curve interpolation is expressed as follows:

$$\sum_{n=0}^{M-1} Z^{-n} \sum_{k=0}^{N-1} Z^{-k} \quad (2)$$

In the case of N=3 and M=4, this equation is equal to $(1+Z^{-1}+Z^{-2}+Z^{-3})(1+Z^{-1}+Z^{-2})=(1,1,1,1)(1,1,1)$ $(1,2,3,3,2,1)$ as described in the aforementioned example.

In the case where a filter expressed by each of the equations (1) and (2) is constructed with a poly phase filter of time-varying coefficient, the number of taps T of the poly phase filter is as follows.

Firstly, in the case of the linear interpolation, the number of taps T is as follows:

$$T = (2N-1)/N$$
$$= 2 - (1/N) < 2$$

That is, the number of taps T is surely lower than 2, so that two taps are enough to construct the poly phase filter even if the conversion ratio N/M is taken as any number.

That is, a filter for the linear interpolation has a simple construction and has high flexibility for the interpolation processing having a different conversion ratio. Further, it can cope with the change of conversion ratio by changing the setting of coefficients.

On the other hand, in the case of the curve interpolation, the number of taps T is an integral number satisfying the following equation.

$T \geq (M+N-1)/N$

Therefore, the number of required taps is different depending on the values of M and M, that is, the conversion ratio.

The value of M is considered as the following equation from the number of taps T.

$M \leq (T-1)N+1$

Letting the number of taps T=2, the value of M is an integral number satisfying $M \leq N+1$; letting the number of taps T=3, the number M is an integral number satisfying $M \leq 2N+1$.

That is, in the case of reducing the conversion ratio N/M to be lower than N/(N+1), the number of required taps for the filter increases.

As described above, in the case of performing the linear interpolation by the filtering of the equation (1) on image data, image quality becomes much worse as the conversion ratio becomes apart from one. However, it is easy to change conversion ratios and a circuit construction becomes simple.

Further, in the case of performing the curve interpolation by the filtering of the equation (2) on image data, images can retain high image quality irrespective of the conversion ratio. However, the number of required taps are different depending on the conversion ratio, so that a circuit construction becomes complicated for easily changing conversion ratios.

2. Circuit Construction of Digital Still Camera

Figure 5:
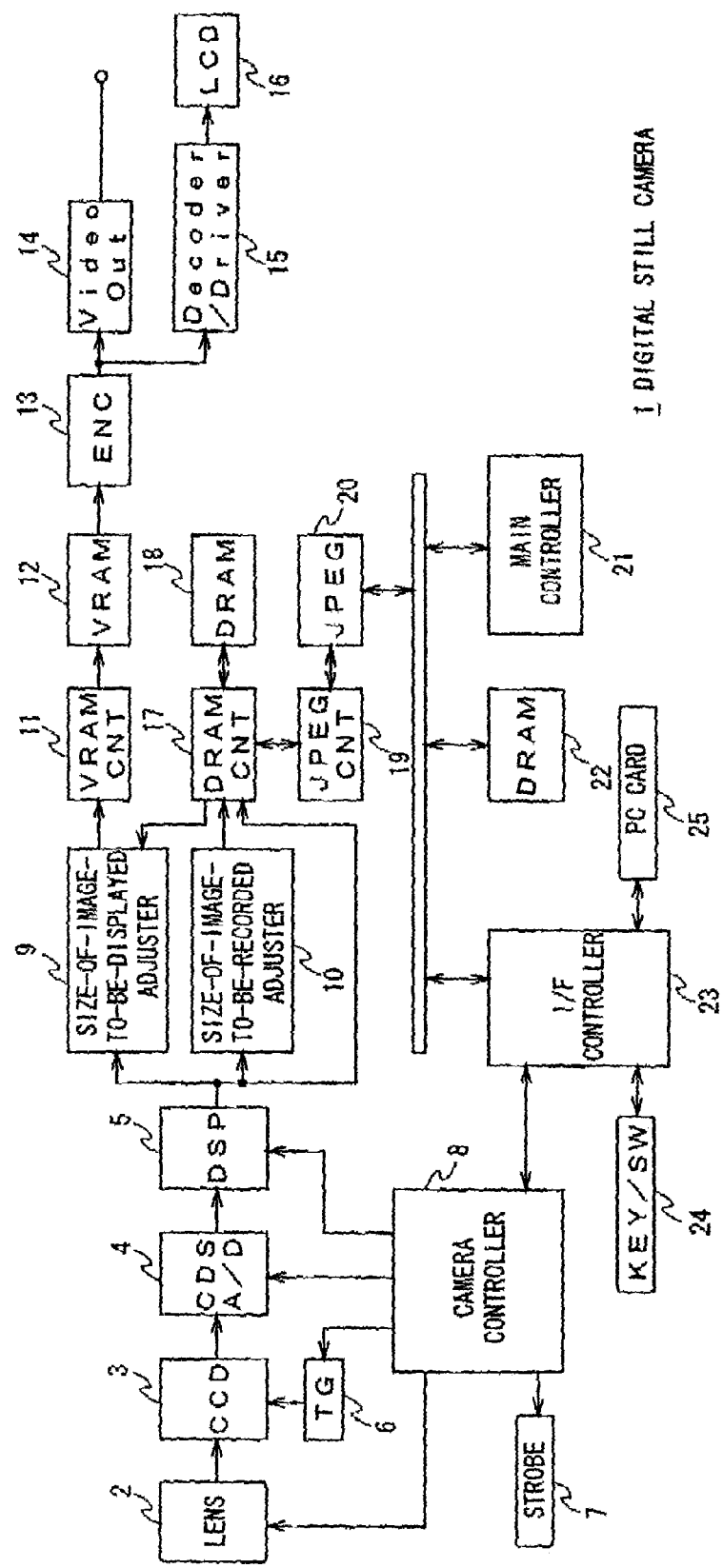
FIG. 5 is a block diagram showing the circuit structure of a digital still camera according to the present invention.

The circuit construction of such a digital still camera 1 using the linear interpolation and the curve interpolation according to the present invention will be described in detail with reference to FIG. 5.

A lens 2 of the digital still camera 1 is a section which includes a zoom lens, a lens such as a focus lens, and a lens driver for driving these lenses to perform a focus adjustment, a zoom adjustment, and or iris adjustment.

The digital still camera 1 firstly receives rays which are incident through the lens 2, and forms their image on CCD (Charge Coupled Device) secondary solid image pickup elements 3 (hereinafter, simply referred to as CCD) being photoelectric converting elements. The CCD 3 forms a two-dimensional image area by arranging the photoelectric converting elements in the form of matrix, in a vertical and a horizontal directions, reads a signal charge for one frame via the image area within 1H (H is a period of horizontal scanning), and supplies this as image data to a CDS (Correlated Double Sampling) and an A/D (Analog/Digital) converting circuit 4.

A timing generator 6 generates a reference timing for driving the CCD 3 and outputs a vertical scanning signal and a horizontal scanning signal to the CCD 3 based on the reference timing, thereby controlling the photograph operation of the CCD 3. In addition, the timing generator 6 switches the one channel reading/the two channel reading by the control of setting the vertical scanning signal and the horizontal scanning signal.

The CDS and A/D converting circuit 4 performs a sample/hold operation called a correlation double sampling on image data. Since a precharge level (black level) and a data level (signal level) are alternatively output, this correlation double sampling samples each of the precharge level and the data level individually, and takes a difference between them to restore the normal image signal.

After performing such correlation double sampling, the CDS and A/D converting circuit 4 performs a gain adjustment, a dynamic range adjustment, and an A/D conversion to produce digital image data, and supplies this to the following DSP (Digital Signal Processor) 5.

The DSP 5 performs correction processing, a color separation, a white balance adjustment, a gamma correction and the like, and extracts a R (Red)/G (Green)/B (Blue) signal by the color matrix processing. Then, it performs a Y signal generation, various kinds of Y signal processing, a chroma signal generation and various kinds of color signal processing on the R/G/B signal to output the resultant in form of a luminance signal Y and color difference signals CR (=R−Y) and CB (=B−Y).

Here, the ratio of the amount of data of the luminance signal Y, color difference signals CR, CB is 4:2:2.

Further, the DSP 5 produces a vertical synchronization signal, a horizontal synchronization signal, and a horizontal effective video period signal (XDPHEN) and a vertical effective video period signal (XDPVEN) which are described later, and supplies them to requiring parts.

The movements of the lens 2, the timing generator 6, the CDS and A/D converting circuit 4, and the DSP 5 described above are controlled by the camera controller 8. That is, the camera controller 8 is composed of a microcomputer, and mainly executes control of photographing and stores various kinds of constants and setting values for control in an internal memory or an external memory composed of an EEPROM (Electrically Erasable Programmable Read-Only Memory).

In addition, the camera controller 8 checks the operation of the operating section 24 via the interface controller 23. The operating section 24 has various kinds of keys and switches to be manipulated by a user, for example, a main switch for switching the power-off, the photographing mode, and the reproducing mode, a release button (shutter button) for photographing, a zoom operating key, a focus mode operating key, and a strobe flashing mode key.

In this way, the camera controller 8 instructs the zoom operation, focus operation, and iris adjustment operation of the lens 2 according to these operation keys and switches, instructs timing being the criterion of photographing to the timing generator 6, gives the CDS and A/D converting circuit 4 a gain value and so on, and moreover, controls various kinds of processing of the DSP 5.

Further, the camera controller 8 controls processing timing of the DSP 5 to execute the signal processing in synchronization with image data outputted from CCD 3 in DSP 5 and to control driving of the strobe unit in synchronization with the control of release button in a strobe flashing mode.

The image data (the luminance signal Y, the color difference signals DR and CB) outputted from the DSP 5 is supplied to the size-of-image-to-be-displayed adjuster 9. The size-of-image-to-be-displayed adjuster 9 performs image size adjusting processing (reduction or enlargement) based on the linear interpolation processing on the supplied image data to produce image data to be displayed, and then supplied this to the video RAM (Random Access Memory) controller 11.

The video RAM controller 11 writes the image data, which has been subjected to the image size adjusting processing, in the video RAM 12, and then reads out it from the video RAM 12 at a predetermined timing again and supplies it to the video encoder 13.

The video encoder 13 performs the RGB encode processing and the digital/analog converting processing and so on, on the supplied image data to produce a video signal, and supplies this to the external monitor (not shown) from the video output section 14 for display.

By the way, the video encoder 13, in the case of imposing character images on images to be displayed, imposes the generated character image signal on the video signal and outputs it.

Further, the video encoder 13 supplies the video signal to the decoder/driver 15. The decoder/driver 15 decodes the RGB video signal of the video signal and performs the display driving based on the interlease method, so that the user can monitor the photographed image, that is, the image of the object photographed with the CCD 3, on the liquid crystal display 16 being an LCD (Liquid Crystal Display) treating as a viewfinder.

Further, the image data outputted from the DSP 5 is supplied to the DRAM (Dynamic Random Access Memory) controller 17 directly or via the size-of-image-to-be-recorded adjuster 10.

The DRAM controller 17 writes the image data outputted from the DSP 5 into the DRAM 18. This image data written in the DRAM 18 is treated as record data to be recorded in the PC (Personal Computer) card 25 being a recording medium.

Therefore, the digital still camera 1, in the case of reducing the amount of data and recording them, performs the image size adjusting processing by the curve interpolation filtering (described later in detail) with the size-of-image-to-be-recorded adjuster 10 to reduce the image size.

The JPEG (Joint Photographic Experts Group) controller 19 and JPEG processing circuit 20 perform the image compression by the JPEG method on the image data stored in the DRAM 18, or on the other hand, expand the compressed image data to the original data.

In actual, at the time of recording, the JPEG controller 19 supplies the image data memorized in the DRAM 18 to the JPEG processing circuit 20 to compress it and then, stores the resultant in the DRAM 22. Then, it reads out the stored data from the DRAM 22 at predetermined timings and records it to the PC card 25 via the interface controller 23.

At the time of reproducing, the JPEG controller 19 stores the image data, which has been read out from the PC card 25 via the interface controller 23, in the DRAM 22 once, and supplies this to the JPEG processing circuit 20 to expand it, and then, supplies the resultant to the size-of-image-to-be-displayed adjuster 9.

The main controller 21 is a section to control the whole of these sections, and holds the various kinds of constants and setting values for control in an internal memory or in an external memory composed of the EEPROM. Therefore, the main controller 21 controls the monitor operation, the recording operation, and the reproducing operation according to the manipulation of operating section 24.

Here, the monitor operation, the recording operation and the reproducing operation are executed by some sections under the control of the main controller 21 as follows.

The monitor operation is an operation to be executed during the duration of time when the user selects an object for the recording operation. That is, during this duration of time, an operation of displaying the image, which has been photographed with the CCD 3, on a liquid crystal display 16 or the external monitor connected to the video output section 14 is executed.

Therefore, the main controller 21 instructs the camera controller 8 to perform the photographing operation and also instruct each of the size-of-image-to-be-displayed adjuster 9 and the video RAM controller 11—the liquid crystal display 16 to perform operations for display.

The recording operation is an image recording operation to be executed according to the shutter operation of the user. That is, firstly the shutter operation of the operating section 24 is detected by the interface controller 23 and is transmitted to the main controller 21 and the camera controller 8.

At this time, the camera controller 8 confirms the luminance level detected by the DSP 5 and flashes the strobe 7 if necessary. And it instructs the timing generator 6 to output image data treated as a recording image from the CCD 3.

The image data outputted via the CCD 3, the CDS and A/D converting circuit 4, the DSP 5 is stored in the DRAM 18 after being subjected to the image size adjusting processing by the size-of-image-to-be-recorded adjuster 10 according to necessity. Then, when the frame images are stored in the DRAM 18, the JPEG controller 19 supplies the image data, which has been stored in the DRAM 18, to the JPEG processing circuit 20 to compress them, and then stores the resultant in the DRAM 22, as described above.

At this time, the main controller 21 controls the image data, which has been stored in the DRAM 22, to record it in the PC card 25 via the interface controller 23.

The reproducing operation is an operation of reproducing and displaying the image data recorded in the PC card 25 according to the manipulation of the user. That is, the main controller 21 reads out required image data from the PC card 25 via the interface controller 23 according the manipulation of the user and stores it in the DRAM 22.

Then the JPEG controller 29 expands the image data, which have been stored in DRAM 22 as described above, with the JPEG processing circuit 20. Then, the expanded image data are supplied to the size-of-image-to-be-displayed adjuster 9 via the DRAM controller 17.

The size-of-image-to-be-displayed adjuster 9, after performing the image size adjusting processing on the supplied image data if necessary, displays the resultant as image data for display on the external monitor connected to the video output section 14 or on the liquid crystal display 16. In this way, the user can confirm images recorded in the PC card 25 with the external monitor or the liquid crystal display 16.

3. Size-of-Image-to-be-Recorded Adjuster

The maximum size of image data which can be recorded in this digital still camera 1 is 1360×1020 picture elements in the horizontal and vertical directions. This size is the size of image data taken in with the CCD 3.

Here, as to recording of image data in the PC card 25, the image data with 1360×1020 picture elements may be used as it is to be recorded after the JPEG compression. However, considering the recording capacity of the PC card 25, the number of frames to be recorded becomes smaller in the case of recording image data having a big image size.

Here, this embodiment provides a mode which is capable of recording more frames by reducing the image size of image data for one frame and recording it. For example, the image data with 1360×1020 picture elements taken in with the CCD 3, after being reduced to image data with 640×480 picture elements, is subjected to the JPEG compression to be recorded in the PC card 25. Such an image size conversion is executed by the size-of-image-to-be-recorded adjuster 10. Note that, the reduction ratio of this case is 8/17.

In actual, the size-of-image-to-be-recorded adjuster 10 is able to change the image size into 8/17. Specially, the image size reduction is performed by filtering using the curve interpolation, which was described in FIGS. 3 and 4 and the expression (2), so as to prevent image quality from big deterioration.

In this case, since N/M=8/17, the minimum construction of the filter in the expression (2) can be represented by (1,1,1,1,1,1,1,1)(1,1,1,1,1,1,1,1,1,1,1,1,1,1,1,1,1)

Figure 6:
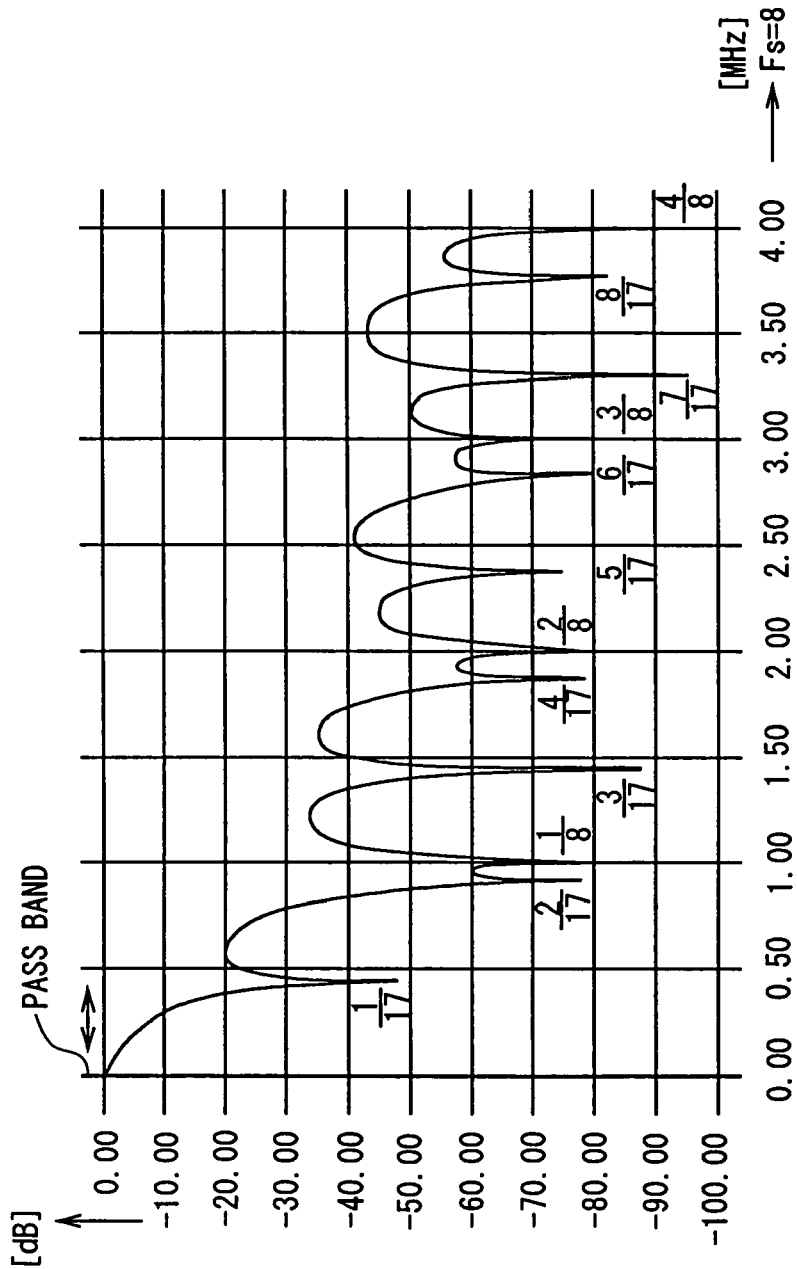
FIG. 6 is a schematic diagram used for explaining the filter characteristic of a size-of-image-to-be-recorded adjuster according to the present invention.

FIG. 6 shows this filter characteristic. In FIG. 6, values which are normalized using the sampling frequency Fs=8 are on the transverse axis (frequency axis). In addition, FIG. 6 shows only the range of frequency 0.00 to 4.00 [MHz], but the characteristic shown in this Figure repeats within the range of 4.00 to 8.00 [MHz].

FIG. 6 shows a filter characteristic in which $1/8$, $2/8$, $3/8$, $4/8$ of the sampling frequency Fs and $5/8$, $6/8$, $7/8$, $8/8$ of the sampling frequency, which are within the range of 4.00 to 8.00 [MHz] and are not shown, each has a zero point as a point having connection with "N", that is, "8". That is, this characteristic is what the carrier components of data to be input to the filter is suppressed.

In addition, FIG. 6 shows a filter characteristic in which $1/17$, $2/17$, $3/17$, $4/17$, $5/17$, $6/17$, $7/17$, $8/17$ of the sampling frequency Fs and $9/17$, $10/17$, $11/17$, $12/17$, $13/17$, $14/17$, $15/17$, $16/17$, $17/17$ of the sampling frequency, which are within the range of 4.00–8.00 [MHz] and are not shown, each has a zero point as a point having connection with "N", that is, "17". This means the filter characteristic in which the frequency components which become carriers after the thinning-out are suppressed.

Therefore, the size-of-image-to-be-recorded adjuster 10 can reduce the aliasing when performing compression to $8/17$. That is, in the compressed image data, the visual remarkable change into low frequency (aliasing) is decreased, so that the image size adjustment can be performed with suppressing the deterioration of image quality.

Further, from N=8 and M=17, the number of taps T required for this filter is as follows:

$$T \geq (17+8-1)/8=3$$

Therefore, 3 taps are required.

Figure 7:
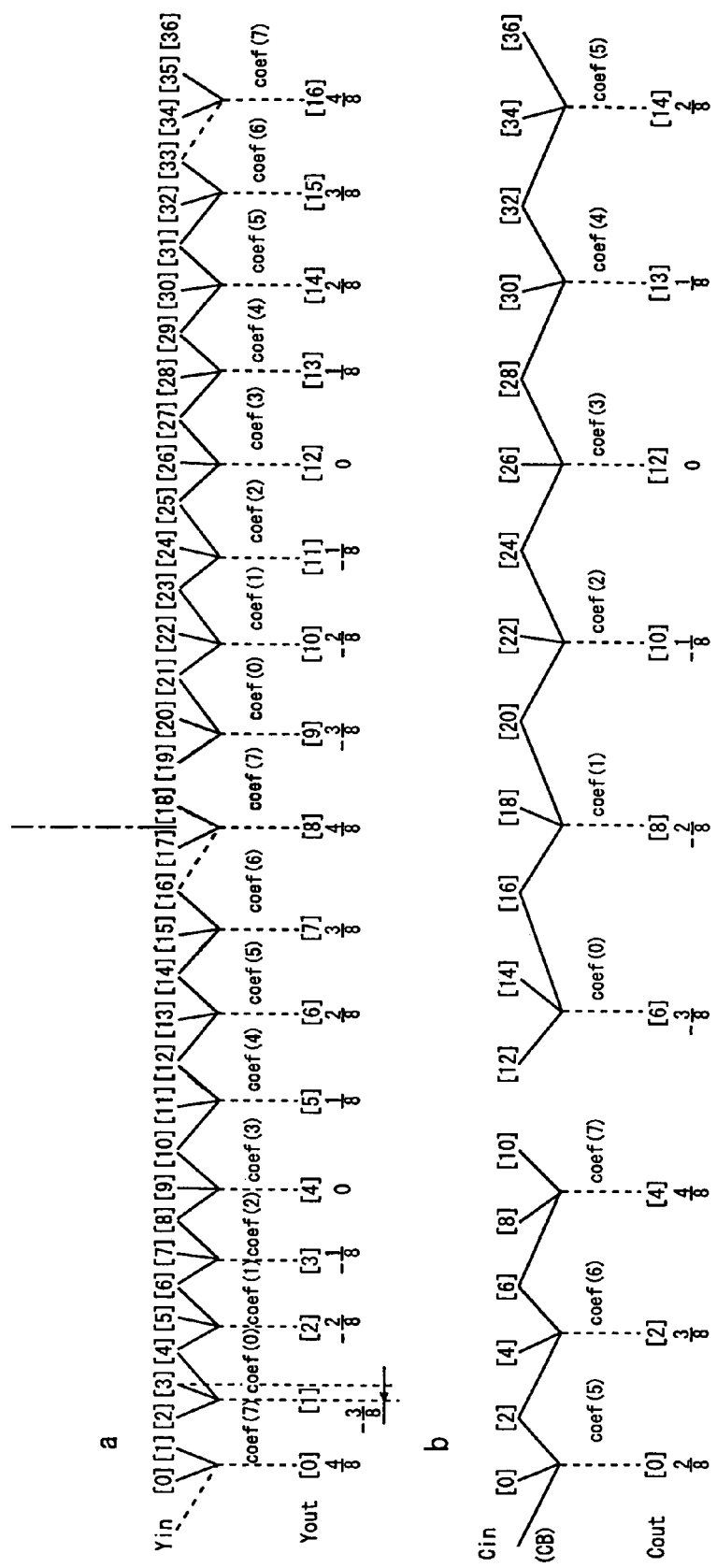
FIG. 7 is a schematic diagram used for explaining the outline of filtering of the size-of-image-to-be-recorded adjuster according to the present invention.

Next, the concept of the filtering which adjusts an image size into 8/17 will be shown in FIG. 7. Here, each number of [0], [1], [2], ..., shows one piece of data. As these data, FIG. 7a shows input data Yin as a luminance signal to be input to the filter and output data Yout after processing, and FIG. 7b shows input data Cin as a color difference signal to be input to the filter and output data Cout after processing. Here, since the color difference signal is shown by either CB or CR, the intervals of input timing of data are twice that of the luminance signal.

Further, the coef (0)–the coef (7) show coefficients as a poly phase filter having the time-varying coefficient. For example, the input data Yin [2], [3], [4] of the luminance signal obtained by 3 taps are multiplied by the coefficient coef (0). Concretely, the data [2] is multiplied by the coef (0(1)), the data [3] is multiplied by the coef (0(2)), and the data [4] is multiplied by the coef (0(3)). Then, by adding these multiplied values, the output data Yout [1] is obtained.

Note that, each value (for example, −3/8 with respect to the output data Yout [1]) shown below output data shows a shift amount from the reference timing as an amount shown by the arrow in this Figure. This is the value which can be treated as a calculation coefficient as described above.

With respect to the input data Yin as the luminance signal, FIG. 7 shows that the output data Yout [0]–[8], which has been reduced to 8/17, are obtained from the input data [0]–[17]. In addition, with respect to the input data Cin as the color difference signal, the output data Cout [0]–[13], which has been reduced to 8/17, are obtained from the input data [0]–[32].

Further, with respect to the output data Yout [0]–[8] and Cout [0]–[13], the curve interpolation is realized because coefficients shown below are given from the input data by three taps.

Hereinafter, the construction and operations of the size-of-image-to-be-recorded adjuster 10 according to this embodiment will be described.

Figure 8:
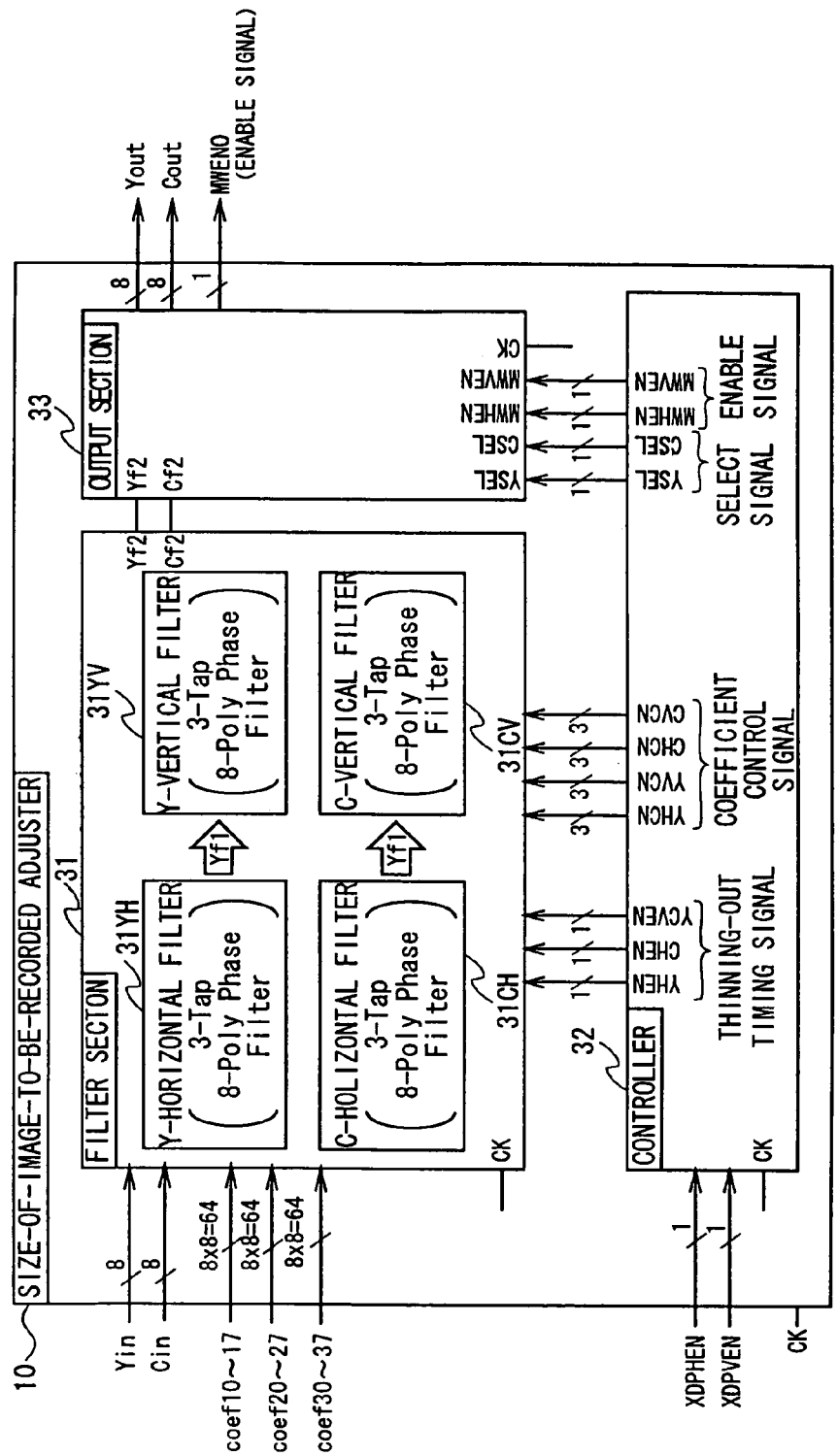
FIG. 8 is a block diagram showing the construction of the size-of-image-to-be-recorded adjuster according to the present invention.

FIG. 8 shows an internal construction of the size-of-image-to-be-recorded adjuster 10 which includes a filter section 31, a controller 32, and an output section 33.

The filter section 31 receives the input data Yin as luminance data and the input data Cin as color different data from the DSP 5.

The filter section 31 applies a horizontal filtering to the input data Yin with a Y-horizontal filter 31YH to generate data Yf1, and then applies a vertical filtering to the data Yf1 with a Y-vertical filter 31YV to generate data Yf2 which is then supplied to the output section 33.

Here, the input data Yin is data with 1360×1020 picture elements, and the data Yf2 is data with 640×480 picture elements, which has been compressed into 8/17.

Further, the filter section 31 applies a horizontal filtering to the input data Cin with a C-horizontal filter 31CH to generate data Cf1, and then applies a vertical filtering to this with a C-vertical filter 31CV to generate data Cf2 which is then supplied to the output section 33.

Here, the input data Cin is data for two channels comprised of CB data with 680×1020 picture elements and CR data with 680×1020 picture elements, and the data Cf2 is data for two channels, which has been reduced to 8/17, comprised of CB data with 320×480 picture elements and CR data with 320×480 picture elements.

The Y-horizontal filter 31YH, the Y-vertical filter 31YV, the C-horizontal filter 31CH, and the C-vertical filter 31CV each is 3-tap 8 poly phase filter. The coef 10–17, the coef 20–27, and the coef 30–37, with eight bits, are supplied in common to the filters as multiplication coefficients, and are set to an internal register described later.

The output section 33 executes the timing adjustment (phase adjustment) to write the data Yf2 and the data Cf2 in the DRAM 18 of the latter stage, and supplies the data, which has been subjected to the timing adjustment, to the DRAM controller 17 as the output data Yout and Cout together with a memory write enable signal MWENO. In this way, the data Yout and Cout are written in the DRAM 18.

The controller 32 outputs signals regulating various kinds of timing to the filter section 31 and the output section 33. In actual, the controller 32 generates various signals based on the horizontal effect image period signal XDPHEN and the vertical effect period signal XDPVEN from the DSP 5. That is, the controller 32 executes the operations of the filter section 31 and the output section 32 according to respective timing signals described next, during the time when the horizontal effect image period signal XDPHEN and the vertical effect period signal XDPVEN are both "L" levels.

At first, the controller 32 supplies the thinning-out timing signals YHEN, CHEN, YCVEN to the filter section 31 to perform compression into 8/17 and also supplies the coefficient control signals YHCN, YVCN, CHCN, and CVCN.

The thinning-out timing signal YHEN regulates the thinning-out timing in the horizontal direction for the input data Yin in the Y-horizontal filter 31YH.

The thinning-out timing signal CHEN regulates the thinning-out timing in the horizontal direction for the input data Cin in the C-horizontal filter 31CH.

The thinning-out timing signal YCVEN regulates the tinning-out timing in the vertical direction in each of the Y-vertical filter 31YV and the C-vertical filter 31CV.

The coefficient control signal YHCN is a coefficient address in the Y-horizontal filter 31YH being a poly phase filter. That is, it is a signal to control to sequentially switch the coefficients coef 10–17, coef 20–27, coef 30–37 each having 8 stages.

Similarly, the coefficient control signals YVCN, CHCN, and CVCN are coefficient addresses for the Y-vertical filter 31YV, the C-horizontal filter 31CH, and the C-vertical filter 31CV, respectively.

Further, the controller 32 supplies the select signals YSEL, CSEL, the memory write enable signals MWHEN, MWVEN to the output section 33.

The select signals YSEL and CSEL are control signals to rearrange data in the output section 33.

The memory write enable signals MWHEN and MWVEN are respectively a horizontal component and a vertical component of the origin of the memory write enable signal MWENO which is supplied to the DRAM controller 17.

Sequentially, FIGS. 9–12 show the circuit constructions of the Y-horizontal filter 31YH, the Y-vertical filter 31YV, the C-horizontal filter 31CH and the C-vertical filter 31CV, respectively. And the operations of the filter section 31 will be described with reference to the timing charts of FIGS. 13–17.

Figure 13:
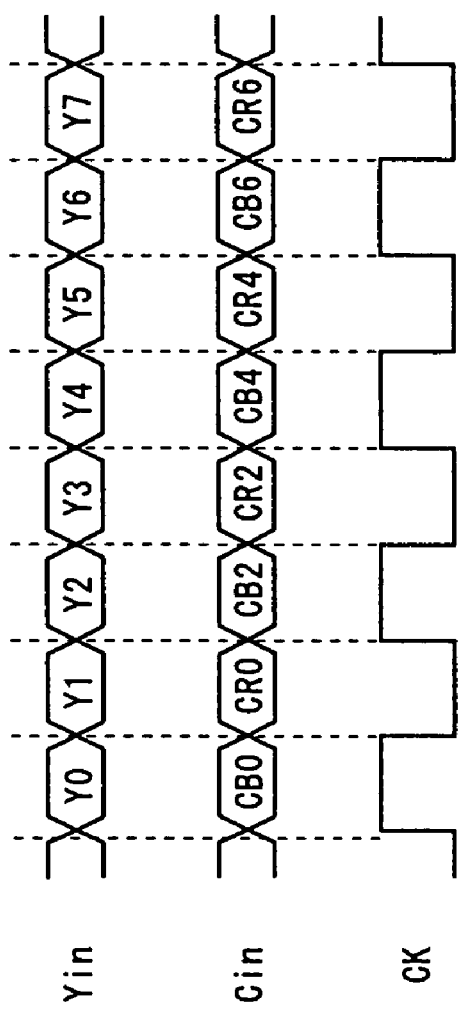
FIG. 13 is a schematic diagram used for explaining input data which is input to the size-of-image-to-be-recorded adjuster according to the present invention.

Firstly FIG. 13 shows the input data Yin and Cin, in which the ratio of Y:CB:CR is equal to 4:2:2. Therefore, data Y0, Y1, Y2, . . . , with eight bits, are supplied as input data Yin from the DSP 5 with timing of the clock CK, and data CB0, CR0, CB2, CR2, CB4, CR4, . . . , with eight bits, are supplied as input data Cin with timing of the clock CK.

Figure 9:
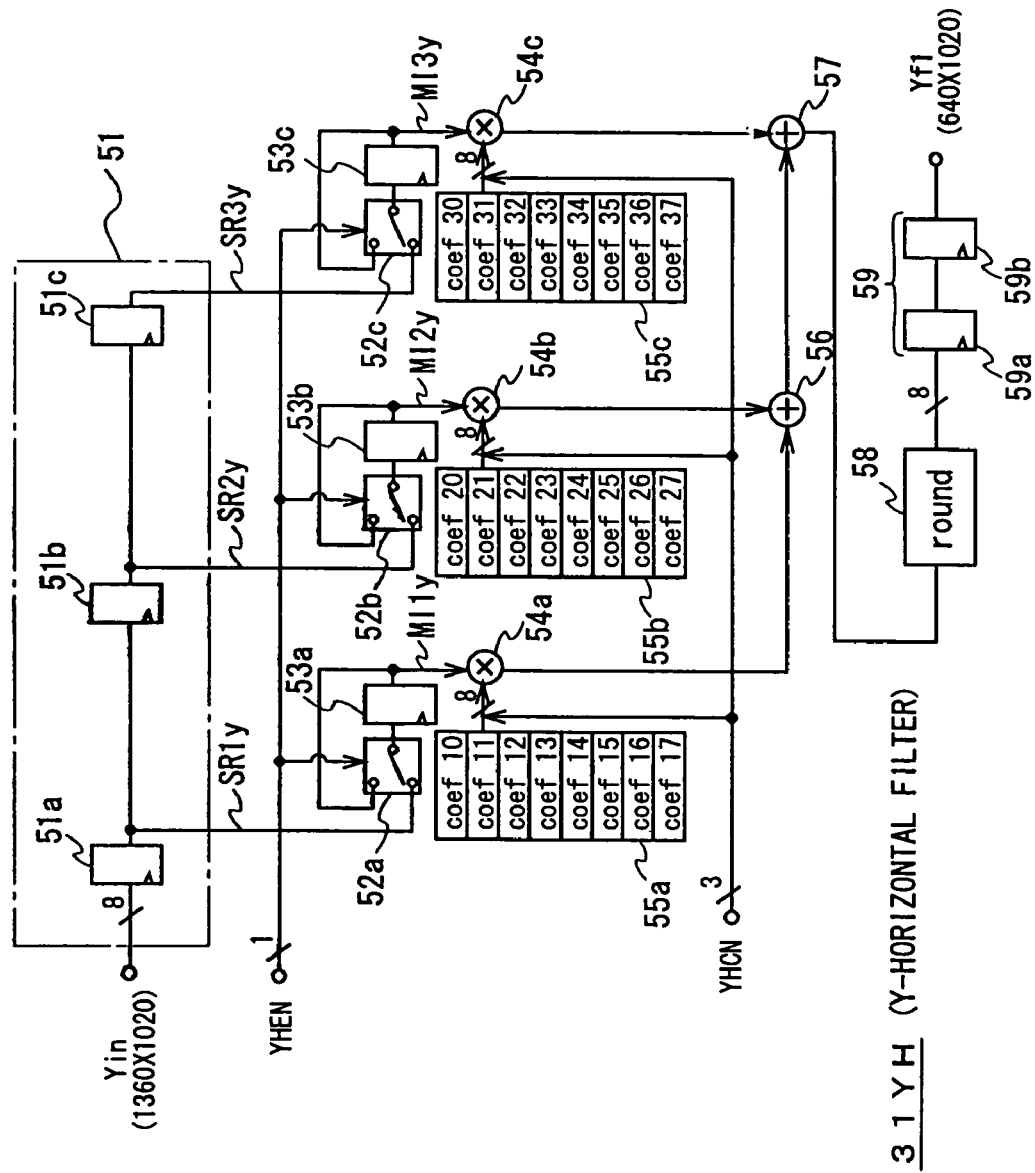
FIG. 9 is a block diagram showing the circuit structure of a Y-horizontal filter in the size-of-image-to-be-recorded adjuster according to the present invention.
Figure 14:
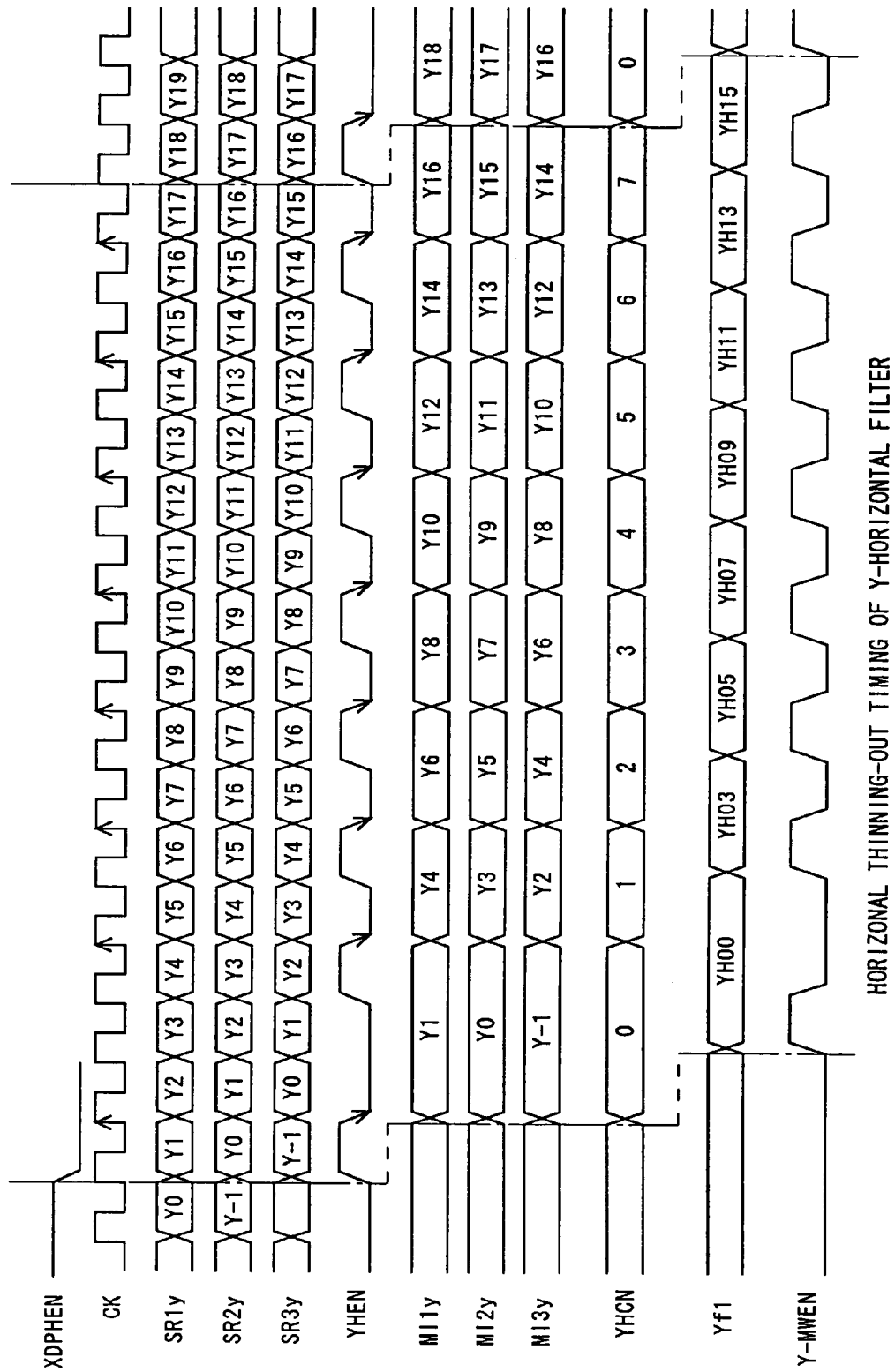
FIG. 14 is a timing chart used for explaining the operation of the Y-horizontal filter according to the present invention.

The input data Yin is input to the Y-horizontal filter 31YH having the construction shown in FIG. 9, and is processed as shown in the timing chart of FIG. 14. Note that, the processing in FIG. 14 is performed during the time when the horizontal effect video period signal XDPHEN is a "L" level.

In FIG. 9, the Y-horizontal filter 31YH has a shift register 51 composed of latch circuits 51a, 51b, and 51c. The latch circuits 51a, 51b, and 51c delay input data Yin for one clock timing to obtain data SR1y, SR2y, and SR3y by three taps which are then supplied to the latch circuits 53a, 53b, and 53c via the switches 52a, 52b, and 52c, respectively. That is, the data SR1y to SR3y have a relation with the input data Yin shown in FIG. 13, as shown in FIG. 14.

The latch circuits 53a, 53b, and 53c supply the latch output data MI1y, MI2y, and MI3y to the multipliers 54a, 54b, and 54c, respectively. Here, the switches 52a, 52b, and 52c are switched based on the thinning-out timing signal YHEN. Specifically, input data to the latch circuits 53a, 53b, and 53c are selected between the data SR1y, SR2y, and SR3y and the latch output data MI1y, MI2y, and MI3y by the switches 52a, 52b, and 52c, respectively, so that the latch output data MI1y, MI2y, and MI3y of the latch circuits 53a, 53b, and 53c are in the state where data has been thinned out.

As time passes, the latch output data MI1y, MI2y, and MI3y are changed to (Y1, Y0, Y−1)→(Y4, Y3, Y2)→(Y6, Y5, Y4) . . . , according to the thinning-out timing signal YHEN shown in FIG. 14. That is, data by three taps in which the thinning-out has been performed is obtained as shown at the upper stage of FIG. 7a.

On the other hand, the coef 10–17, the coef 20–27, the coef 30–37, with eight bits, are set in the registers 55a, 55b, 55c as multiplication coefficients, respectively. The multiplication coefficients to be supplied to the multipliers 54a, 54b, 54c are changed according to the coefficient control signal (coefficient address) YHCN supplied from the controller 32.

That is, as shown in FIG. 14, in the case of the coefficient control signal YHCN=0, the coef 10, the coef 20 and the coef 30 are output from the registers 55a, 55b, 55c, and then are multiplied by the latch output data MI1y, MI2y, MI3y at the multipliers 54a, 54b, 54c, respectively. That is, the multiplication is performed: Y1×coef 10 at the multiplier 54a; Y0×coef 20 at the multiplier 54b; and Y−1×coef 30 at the multiplier 54c.

Further, in the case of the coefficient control signal YHCN=1, the coef 11, the coef 21 and the coef 31 are output from the registers 55a, 55b, 55c, respectively. Therefore, the multiplication is performed: Y4×coef 11 at the multiplier 54a; Y3×coef 21 at the multiplier 54b; and Y2×coef 31 at the multiplier 54c.

After that, similarly, the multiplication coefficients are changed and are multiplied by the latch output data MI1y, MI2y, MI3y.

Then, the outputs of the multipliers 54a, 54b, 54c are added at the adders 56 and 57, and the resultant is subjected to the round-off processing by a round-off processor 58 and then is output as data Yf1 via the timing adjuster 59 comprised of latch circuits 59a and 59b.

For example, letting (Y1×coef 10)+(Y0×coef 20)+(Y−1×coef 30)=YHO0, (Y4×coef 11)+(Y3×coef 21)+(Y2×coef 31)=YHO3, . . . , the data Yf1 (=YHO0, YHO3, YHO5, . . . ) shown in FIG. 14 is output.

This data Yf1 is data of which the image size has been adjusted in the horizontal direction, and it has 640×1020 picture elements and is supplied to the following Y-vertical filter 31YV.

Note that, the timing adjuster 59 adjusts timing between the data Yf1 and the output data Cf1 from the C-horizontal filter 31CH described later, and delays the data Yf1 for a predetermined period of time. In addition, as shown in FIG. 14, the timing adjuster 59 forms a memory write enable signal Y-MWEN for the data Yf1, and outputs the data Yf1 based on the memory write enable signal Y-MWEN with timings synchronized to the output data Cf1 from the C-horizontal filter 31CH.

Figure 11:
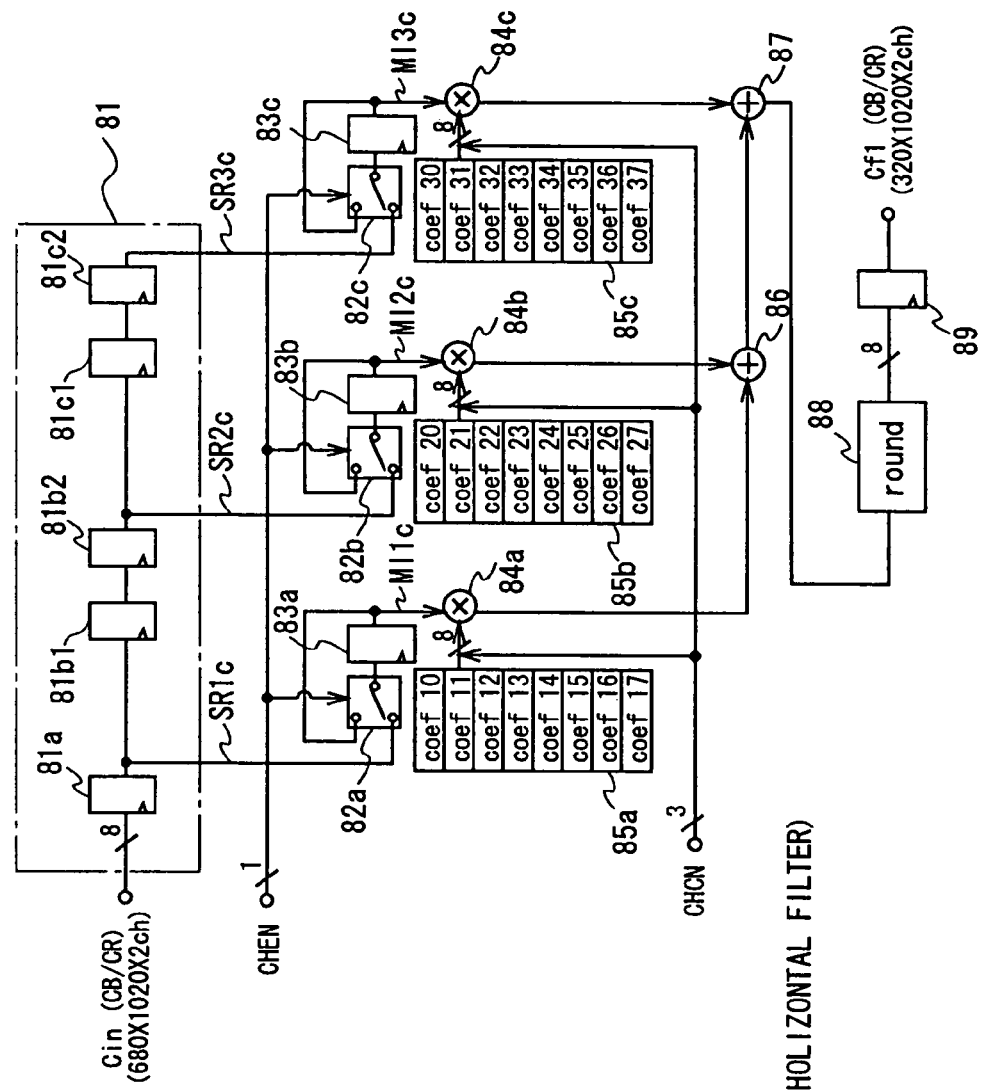
FIG. 11 is a block diagram showing the circuit structure of a C-horizontal filter in the size-of-image-to-be-recorded adjuster according to the present invention.

Next, as shown in FIG. 11, the C-horizontal filter 31CH has a shift register 81 composed of latch circuits 81a, 81b1, 81b2, 81c1 and 81c2. The latch circuit 81a performs a delay of one clock timing, and the latch circuits 81b1 and 81b2, and 81c1 and 81c2 perform a delay of two clock timing. As a result, data SR1c, SR2c and SR3c by three taps are obtained and are supplied to the latch circuits 83a, 83b, and 83c via the switches 82a, 82b, and 82c. Specifically, the data SR1c to SR3c with respect to the input data Cin shown in FIG. 13 are shown in FIG. 15, that is, those are data delayed for two clocks with data CB and CR as a pair.

The latch circuits 83a, 83b, and 83c supply the latch output data MI1c, MI2c, and MI3c to the multipliers 84a, 84b, and 84c. Here, the switches 82a, 82b, and 82c are switched based on the thinning-out timing signal CHEN. That is, depending on the switches 82a, 82b, and 82c, input data to the latch circuits 83a, 83b, and 83c are selected between the data SR1c, SR2c, SR3c and the latch output data MI1c, MI2c, MI3c, respectively, so that the latch output data MI1c, MI2c and MI3c of the latch circuits 83a, 83b, and 83c are in the state in which the thinning-out has been performed.

Figure 15:
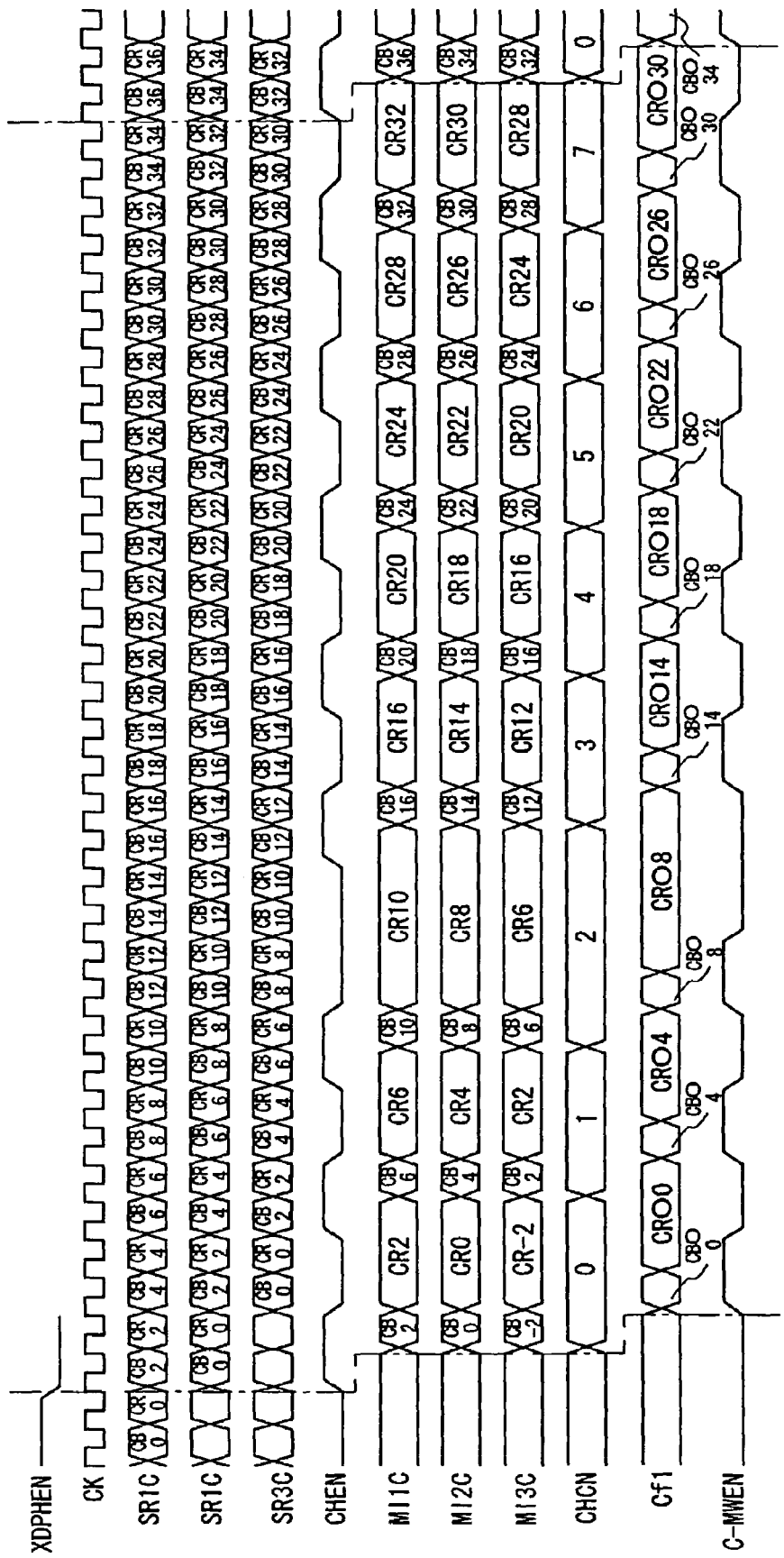
FIG. 15 is a timing chart used for explaining the operation of the C-horizontal filter according to the present invention.

As time passes, the latch output data MI1c, MI2c and MI3c are changed at timing of the thinning-out timing signal CHEN shown in FIG. 15. In this case, since the thinning-out timing signal CHEN is a pulse of two-clock cycle, the data CB and CR are selected in pairs.

Therefore, the latch output data MI1c, MI2c, and MI3c are changed to (CB2, CB0, CB−2)→(CR2, CR0, CR−2)→(CB6, CB4, CB2)→(CR6, CR4, CR2)→ . . . , that is, data by three taps which has been subjected to the thinning-out can be obtained as shown in the upper stage of FIG. 7b.

On the other hand, the coef 10–17, the coef 20–27, the coef 30–37, with eight bits, are set as multiplication coefficients to the registers 85a, 85b, and 85c, respectively, as well as the aforementioned registers 55a, 55b, and 55c of the Y-horizontal filter 31YH, and the multiplication coefficients to be supplied to the multipliers 84a, 84b, and 84c are changed according to the coefficient control signal (coefficient address) CHCN supplied from the controller 32.

That is, as shown in FIG. 15, in the case of the coefficient control signal CHCN=0, the coef 10, the coef 20 and the coef 30 are output from the registers 85a, 85b, and 85c and are multiplied by the latch output data MI1c, MI2c, and MI3c at the multipliers 84a 84b, 84c, respectively. That is, at this time, the multiplication is performed: CB2×coef 10 at the multiplier 84a; CB0×coef 20 at the multiplier 84b; and CB−2×coef 30 at the multiplier 84c.

Further, in the case of the coefficient control signal CHCN=1, the coef 11, the coef 21 and the coef 31 are output from the registers 85a, 85b, and 85c and therefore, at this time, the multiplication is performed: CR2×coef 11 at the multiplier 84a; CR0×coef 21 at the multiplier 84b; and CR−2×coef 31 at the multiplier 84c.

Furthermore, at the next timing when the coefficient control signal CHCN=2, the coef 12, the coef 22 and the coef 32 are output from the registers 85a, 85b, and 85c and therefore, at this time, the multiplication is performed: CB6×coef 12 at the multiplier 84a; CB4×coef 22 at the multiplier 84b; and CB2×coef 32 at the multiplier 84c.

Hereinafter, similarly, the multiplication coefficients are changed and also are multiplied by the corresponding latch output data MI1c, MI2c, MI3c.

Then, the outputs of the multipliers 84a, 84b, and 84c are added by the adders 86 and 87, and the resultant is subjected to the round-off processing by the round-off processor 88 and then is output through the latch circuit 89 as data Cf1.

For example, (CB2×coef 10)+(CB0×coef 20)+(CB−2×coef 30)=CBO0, (CR2×coef 11)+(CR0×coef 21)+(CR−2×coef 31)=CRO0 and (CB6×coef 12)+(CB4×coef 22)+(CB2×coef 32)=CBO4 are obtained, and data Cf1 (=CBO0, CRO0, CBO4, CRO4, . . . ) shown in FIG. 15 are output.

This data CF1 is data which has been subjected to the image size adjustment in the horizontal direction, in which the CB data and CR data become data each having 320×1020 picture elements. And these are supplied to the following C-vertical filter 31CV.

Figure 16:
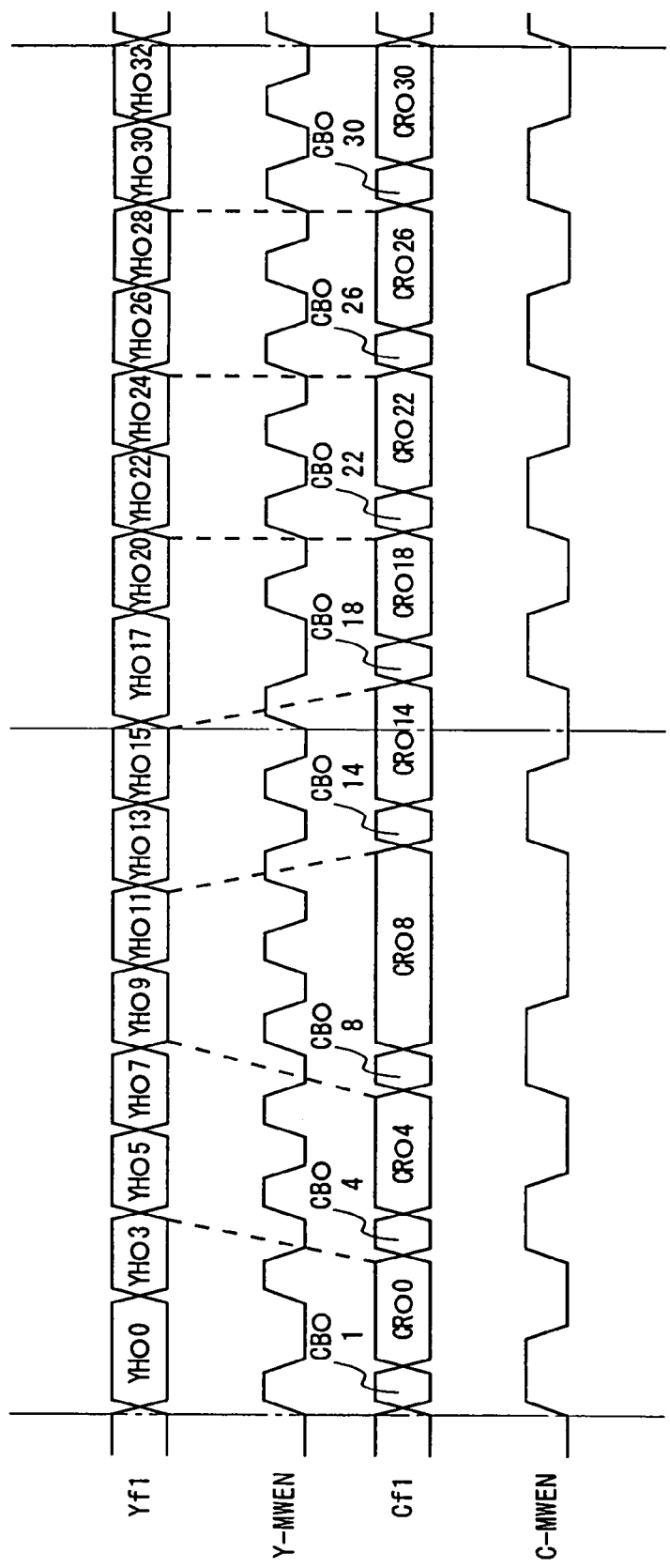
FIG. 16 is a timing chart used for explaining the output timings of the Y-horizontal filter and the C-horizontal filter according to the present invention.

Here, the timing relation between data Yf1 which is output via the timing adjuster 59 from the Y-horizontal filter 31YH described above and the data Cf1 which is output from the C-horizontal filter 31CH is shown in FIG. 16. That is, within the one horizontal line period, luminance data and color different data are different in phase. Therefore, the phase matching processing is performed at the output section 33 as described later.

Figure 10:
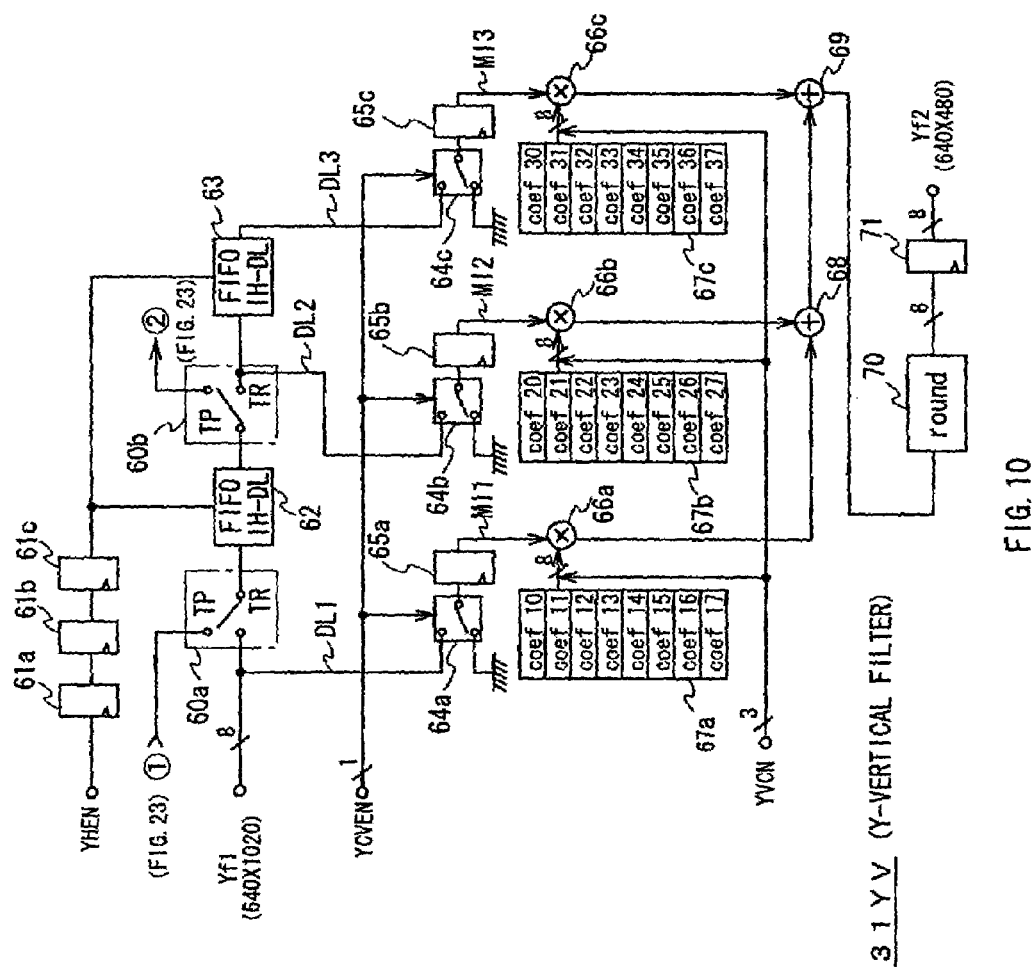
FIG. 10 is a block diagram showing the circuit structure of a Y-vertical filter in the size-of-image-to-be-recorded adjuster according to the present invention.

The data Yf1 output from the Y-horizontal filter 31YH is subjected to filtering in the vertical direction through the Y-vertical filter 31YV shown in FIG. 10. And the data Cf1 output from the C-horizontal filter 31CH is subjected to filtering in the vertical direction through the C-vertical filter 31CV shown in FIG. 12.

Any processing is basically similar and is described with reference to the timing chart of FIG. 17. This processing is performed during the time when the horizontal effective video period signal XDPHEN and the vertical effective video period signal XDPVN are both "L" as shown in Figure.

Figure 12:
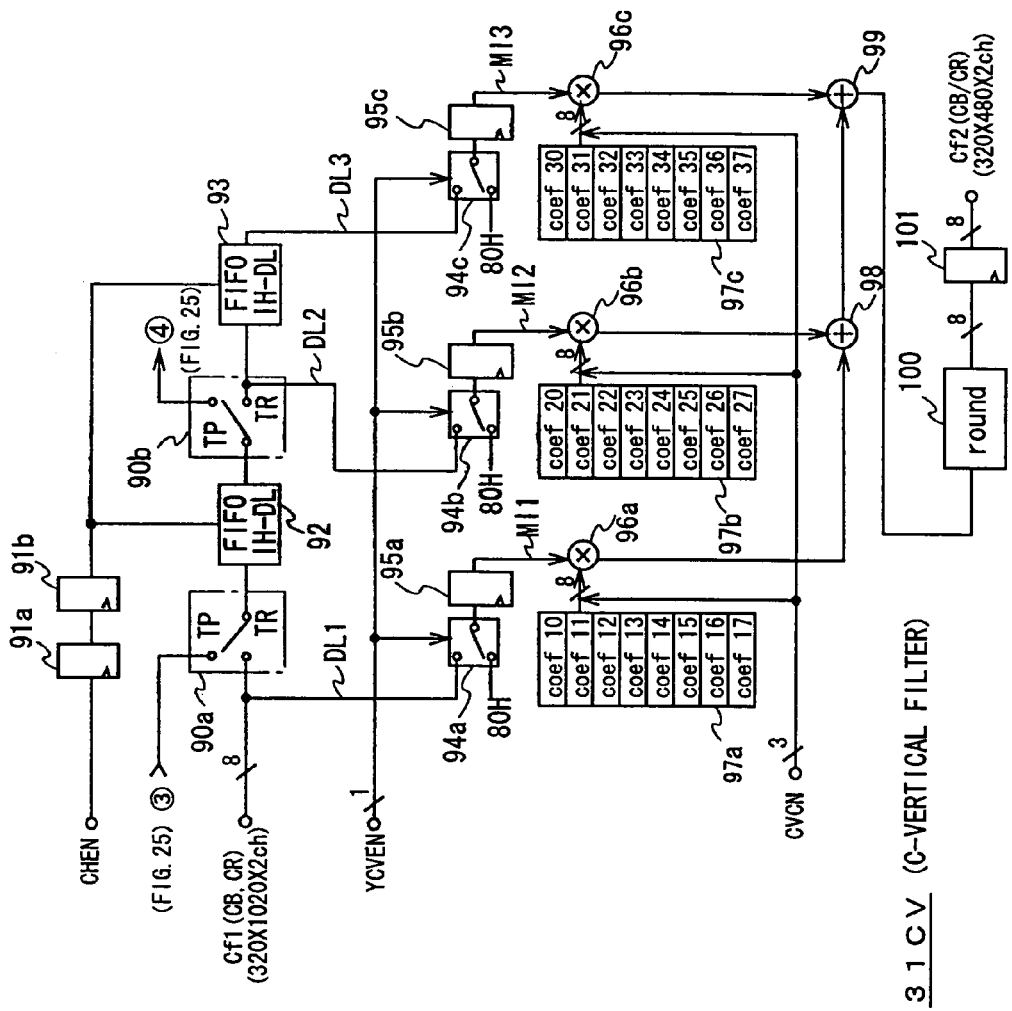
FIG. 12 is a block diagram showing the circuit structure of a C-vertical filter in the size-of-image-to-be-recorded adjuster according to the present invention.

Note that, the switches 60a, 60b of the Y-vertical filter 31YV in FIG. 10 and the switches 90a, 90b of the C-vertical filter 31CV in FIG. 12 are always connected to the TR terminals while the size-of-image-to-be-recorded adjuster 10 performs the image size adjustment, and are switched to the TP terminals when the size-of-image-to-be-displayed adjuster 9 performs the image size adjustment. Therefore, in the explanation of the Y-vertical filter 31YV and the C-vertical filter 31CV, the switches 60a, 60b and the switches 90a, 90b can be ignored.

Firstly, the Y-vertical filter 31YV has line memories 62 and 63 adopting the FIFO (First-in-First-out) method as shown in FIG. 10, and they perform a delay at one horizontal line timing.

Note that, the line memories 62 and 63 stores the supplied data Yf1 based on the thinning-out timing signal YHEN which has been delayed for three clocks by the latch circuits 61a, 61b, 61c. This thinning-out timing signal YHEN is a signal which realizes the thinning-out processing by switching-controlling the switches 52a, 52b and 52c in the aforementioned Y-horizontal filter 31YH, and is supplied corresponding to a three-clock delay of the delay components (the latch circuits 53a (or 53b/53c), 59a, 59b) for the data Yf1 so as to surely take the data Yf1 in the line memories 62 and 63.

Therefore, the Y-vertical filter 31YV can obtain data DL1, DL2, DL3 by three taps through the delays of the line memories 62 and 63. That is, as shown in FIG. 17, the data DL1, DL2, and DL3 become, for example, line data (L1 L0 L−1)→(L2 L1 L0)→(L3 L2 L1)→ . . . , which is delayed every one line.

The data DL1, DL2, and DL3 are input to the latch circuits 65a, 65b, and 65c via the switch 64a, 64b, and 64c, respectively. The latch circuits 65a, 65b, and 65c supply the latch output data MI1, MI2, and MI3 to the multipliers 66a, 66b, and 66c, respectively.

Here, the switches 64a, 64b, and 64c are switched by the thinning-out timing signal YCVEN. That is, the data DL1, DL2 and DL3 are supplied to the latch circuits 65a, 65b, and 65c by the switches 64a, 64b, and 64c in the state where the thinning-out has been performed every line. Therefore, the latch output data MI1, MI2 and MI3 of the latch circuits 65a, 65b, and 65c are in the state in which data has been thinned out every line as shown in FIG. 17.

The coef 10–17, the coef 20–27, the coef 30–37, with eight bits, are set as multiplication coefficients to the registers 67a, 67b, and 67c, respectively, as well as the registers 55a, 55b, and 55c of the Y-horizontal filter 31YH, and the multiplication coefficients to be supplied to the multipliers 66a, 66b, and 66c are changed according to the coefficient control signal (coefficient address) YVCN which is supplied from the controller 32.

Figure 17:
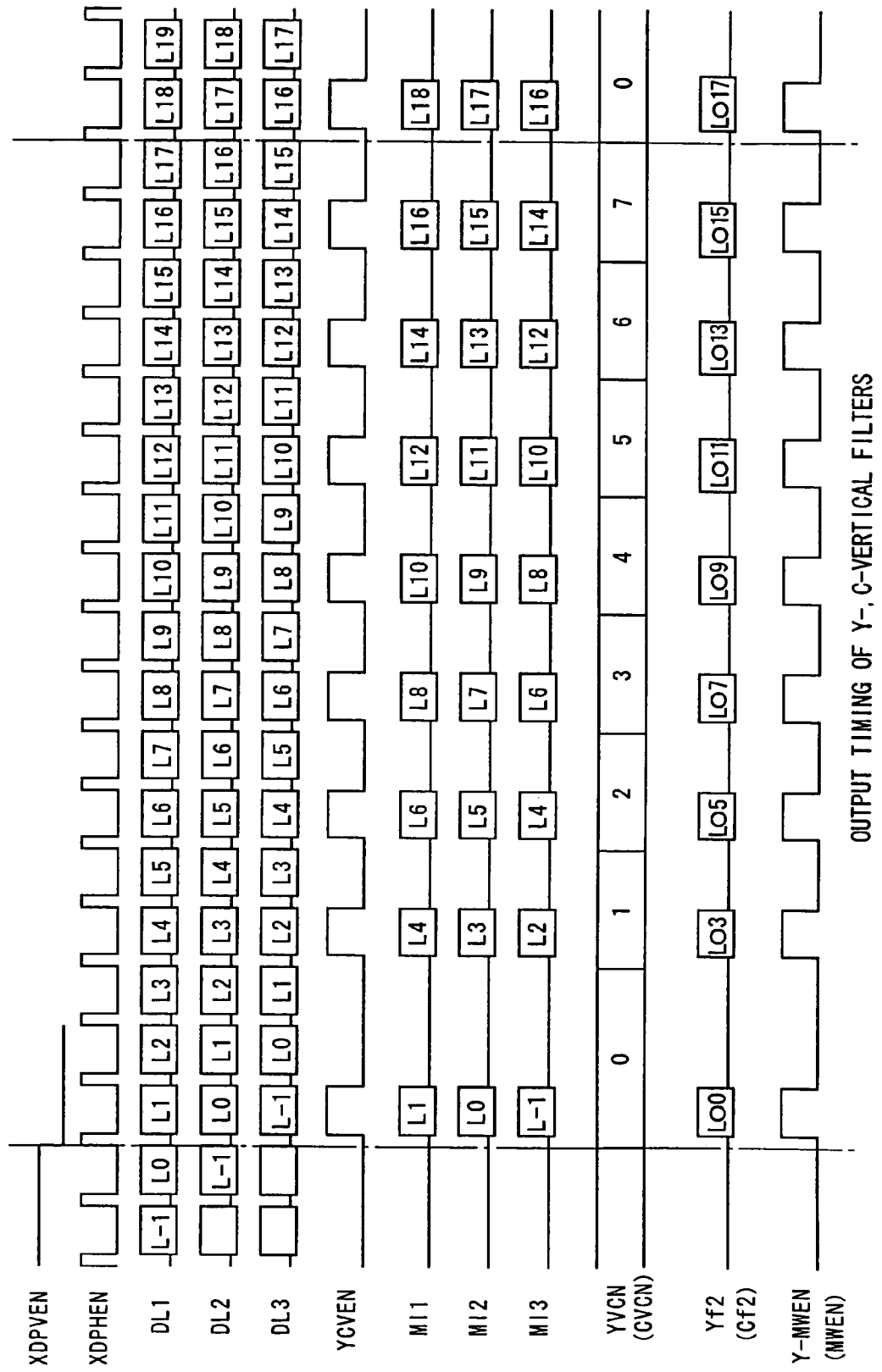
FIG. 17 is a timing chart used for explaining the operations of the Y-vertical filter and the C-vertical filter according to the present invention.

Specifically, as shown in FIG. 17, in the case of the coefficient control signal YVCN=0, the multiplication is performed: L1×coef 10 at the multiplier 66a; L0×coef 20 at the multiplier 66b; and L−1×coef 30 at the multiplier 66c. Further, in the case of the coefficient control signal YVCN=1, the multiplication is performed: L4×coef 11 at the multiplier 66a; L3×coef 21 at the multiplier 66b; and L2×coef 31 at the multiplier 66c.

Hereinafter, similarly, the multiplication coefficients are changed and also are multiplied by the respective latch output data MI1, MI2, and MI3.

Then, the outputs of the multipliers 66a, 66b, and 66c are, added by the adder 68 and 69, and the resultant is subjected to the round-off processing by the round-off processor 70 and is output as data Yf2 through the latch circuit 71.

For example, (L1×coef 10)+(L0×coef 20)+(L−1×coef 30)=LO0 and (L4×coef 11)+(L3×coef 21)+(L2×coef 31)=LO3 are obtained, and data Yf2 (=LO0, LO3, LO5, LO7, . . . ) shown in FIG. 17 are output.

This data Yf2 becomes data with 640×480 picture elements by the image size adjustment in the vertical direction in addition to the horizontal direction, and becomes luminance data which has been subjected to the image size adjustment at the conversion ratio of 8/17 with the filter section 31.

Sequentially, the C-vertical filter 31CV will be described. This also has line memories 92 and 93 adopting the FIFO method, and each of them performs a delay at timing of one horizontal line.

These line memories 92 and 93 store supplied data Cf1 based on the thinning-out timing signal CHEN which has been delayed for two clocks by the latch circuits 91a and 91b. This thinning-out timing signal CHEN is a signal which realizes the thinning-out of data through the switching control of the switches 82a, 82b, and 82c in the aforementioned C-horizontal filter 31CH, and is supplied corresponding to the two-clock delay of the delay components (latch circuits 83a (or 83b/83c) and 89) for the data Cf1 so as to surely take the data Cf1 in the line memories 92 and 93.

This C-vertical filter 31CV can also obtain data DL1, DL2, and DL3 by three taps through the delay of the line memories 92 and 93. Then, the data DL1, DL2, and DL3 are input to the latch circuits 95a, 95b, and 95c via the switches 94a, 94b, and 94c, respectively. The latch circuits 95a, 95b, and 95c supply the latch output data MI1, MI2, and MI3 to the multipliers 96a, 96b, and 96c, respectively.

Here, since the switches 94a, 94b, and 94c are switched by the thinning-out timing signal YCVEN, the latch output data MI1, MI2, and MI3 of the latch circuits 95a, 95b, and 95c are in the state in which data has been thinned out every line, similarly to the aforementioned Y-vertical filter 31YV.

Note that, data "80H" is supplied to the other terminals of the switches 94a, 94b and 94c. This is because color different data is a code having a code (off set binary code) and 80H is a zero code.

Similarly to the Y-vertical filter 31YV, the coef 10–17, the coef 20–27, and the coef 30–37, with eight bits, are set to the registers 97a, 97b, and 97c as multiplication coefficients, and the multiplication coefficients to be supplied to the multipliers 96a, 96b, and 96c are changed according to the coefficient control signal (coefficient address) CVCN which is supplied from the controller 32.

The outputs of the multipliers 96a, 96b, and 96c are added by the adders 98 and 99. The resultant is subjected to the round-off processing by the round-off processor 100 and is output as data Cf2 through the latch circuit 101. The aforementioned processing is similar to that of the Y-vertical filter 31YV described with reference to the FIGS. 10 and 17.

This data Cf2 outputted from the C-vertical filter 31CV becomes CB data with 320×480 picture elements and CR data with 320×480 picture elements by being subjected to the image size adjustment in the vertical direction in addition to the horizontal direction. And this data is color different data which has been subjected to the image size adjustment at the conversion ratio of 8/17 by the filter section 31.

As described above, the data Yf2 and Cf2 which has been subjected to the image size adjustment at the conversion ratio of 8/17 at the filter section 31 are outputted to the following DRAM controller 17 after being subjected to the phase timing adjustment by the output section 33.

Figure 18:
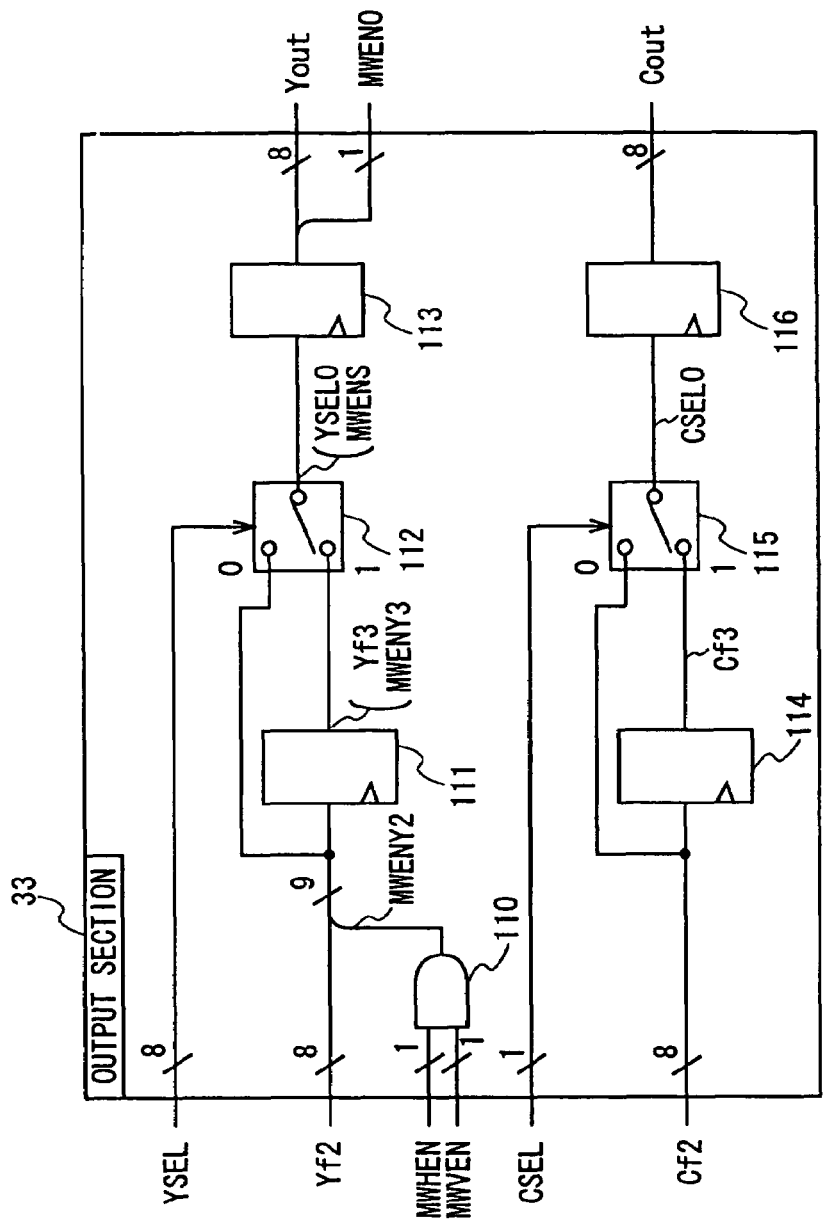
FIG. 18 is a block diagram showing the circuit structure of an output section of the size-of-image-to-be-recorded adjuster according to the present invention.

Next, the constitution of the output section 33 will be described with reference to FIG. 18. The output section 33 is composed of an AND gate 110, latch circuits 111, 113, 114, 115, 116 and switches 112, 115.

The AND gate 110 obtains a logical product of the memory write enable signals MWHEN and MWVEN from the controller 32, and supplies it to the latch-circuit 111 as a memory write enable signal MWENY2 with one bit. Then, the memory write enable signal MWENY2 with one bit and the data Yf2 with eight bits from the Y-vertical filter YV are directly supplied to the 0 terminal of the switch 112.

Further, the memory write enable signal MWENY 2 with one bit and the data Yf2 with eight bits are also supplied to the latch circuit 111 and then, are supplied to the 1 terminal of the switch 112 as one clock delayed data Yf3 and a memory write enable signal MWENY3.

Furthermore, the switch 112 is switched according to the select signal YSEL from the controller 32, and supplies the selected data YSELO and memory write enable signal MWENS to the DRAM controller 17 through the latch circuit 113 as the output data Yout and the memory write enable signal MWENO.

On the other hand, the data Cf2 with eight bits from the C-vertical filter 31CV is directly supplied to the 0 terminal of the switch 115 and is also supplied to the 1 terminal of the switch 115 as the one clock delayed data Cf3 through the latch circuit 114.

The switch 115 is switched according to the select signal CSEL from the controller 32 to supply the selected data CSELO as the output data Cout to the DRAM controller 17 through the latch circuit 116.

Figure 19:
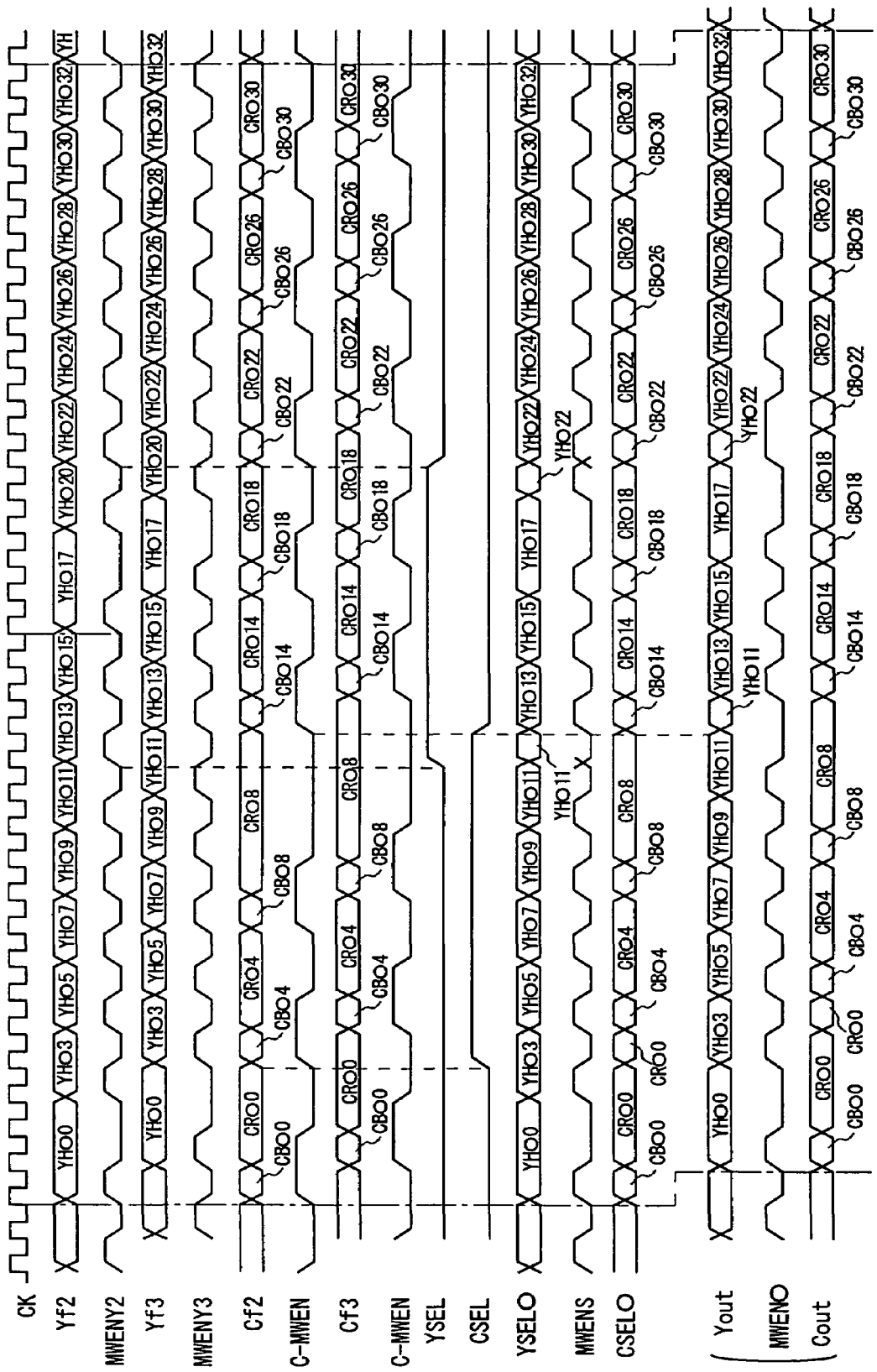
FIG. 19 is a timing chart used for explaining the operation of the output section of the size-of-image-to-be-recorded adjuster according to the present invention.

In actual, from FIG. 19 showing the operations of the output section 3, the data Yf2 and the data Cf2 have a similar phase relation within the horizontal period to the date Yf1 and the data Cf1 as described in FIG. 16.

The data Yf2 and Cf2 having such a relation and the delayed data Yf3 and Cf3 are selected by the switches 112 and 115 according to the select signal YSEL and CSEL as shown in the figure, so that the data YSELO, CSELO, and the memory write enable signal MWENS have a phase relation as shown in the figure. And these are delayed for one clock by the latch circuits 113 and 116, and the output data Yout, the memory write enable signal MWENO, and the output data Cout as shown in the figure can be obtained.

Figure 20:
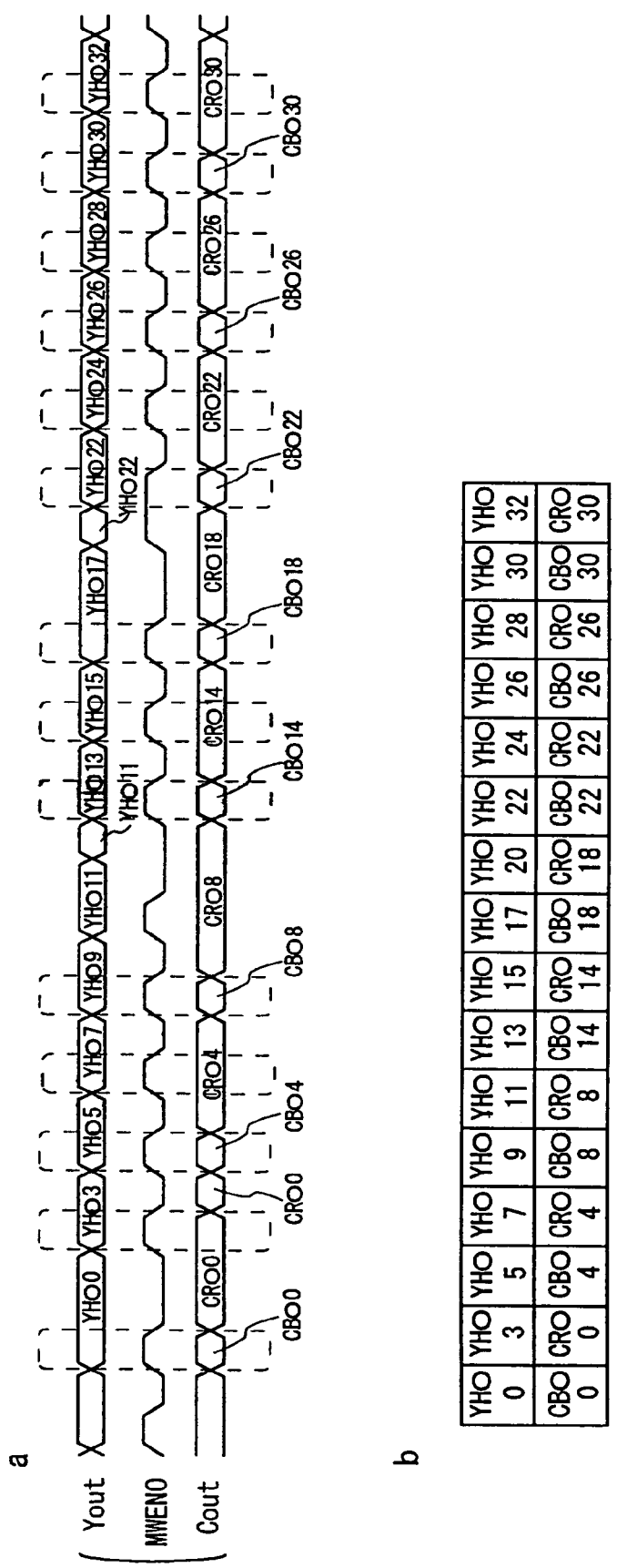
FIG. 20 is a schematic diagram used for explaining output data of the size-of-image-to-be-recorded adjuster according to the present invention.

The output data Yout, the memory write enable signal MWENO and the output data Cout in FIG. 19 are shown in FIG. 20a. In this case, the following DRAM controller 17 writes the output data Yout and Cout in the DRAM 18 based on the memory write enable signal MWENO. That is, data is written in the DRAM 18 within the period of time when the memory write enable signal MWENO is a "H" level, shown by a broken line.

As see from the figure, within at least the period of time regulated by the memory write enable signal MWENO, the luminance data Yout (YHO0, YHJO3, YHO5, . . . ) and the color difference data Cout (CBO0, CRO0, CBO4, CRO4, CBO8, CRO8, . . . ) are in the sate where their phase difference has been adjusted. Therefore, as shown in FIG. 20b, the luminance data Yout (YHO0, YHO3, YHO5, . . . ) and the color difference data Cout (CBO0, CRO0, CBO4, CRO4, CBO8, CRO8, . . . ) are written in the DRAM 18 at proper timing.

In this way, the size-of-image-to-be-recorded adjuster 10 performs the image size adjustment at the conversion ratio of 8/17 on the input data Yin and Cin so as to store the resultant output data Yout and Cout in the DRAM 18. Furthermore, the size-of-image-to-be-recorded adjuster 10 performs the image size adjustment using the filter characteristic shown in FIG. 6, so as to prevent the image quality from big deterioration.

4. Size-of-Image-to-be-Displayed Adjuster

Next, the size-of-image-to-be-displayed adjuster 9 will be described. As described above, the maximum size of image data to be recorded in the digital still camera 1 in this embodiment is 1360×1020 picture elements in the horizontal and vertical directions. Image data having this number of picture elements, of course, may be used as it is as image data to be displayed on the liquid crystal display 16 or on an external monitor. However, the case where an image size has to be reduced because of the mechanism of a display or the case where the enlargement display or the reduction display is desired may occur.

For this reason, image size adjustment which is flexible to a certain extent is required for image data with 1360×1020 picture elements, and such an image size conversion is to be executed by a linear interpolation of the size-of-image-to-be-displayed adjuster 9.

Figure 21:
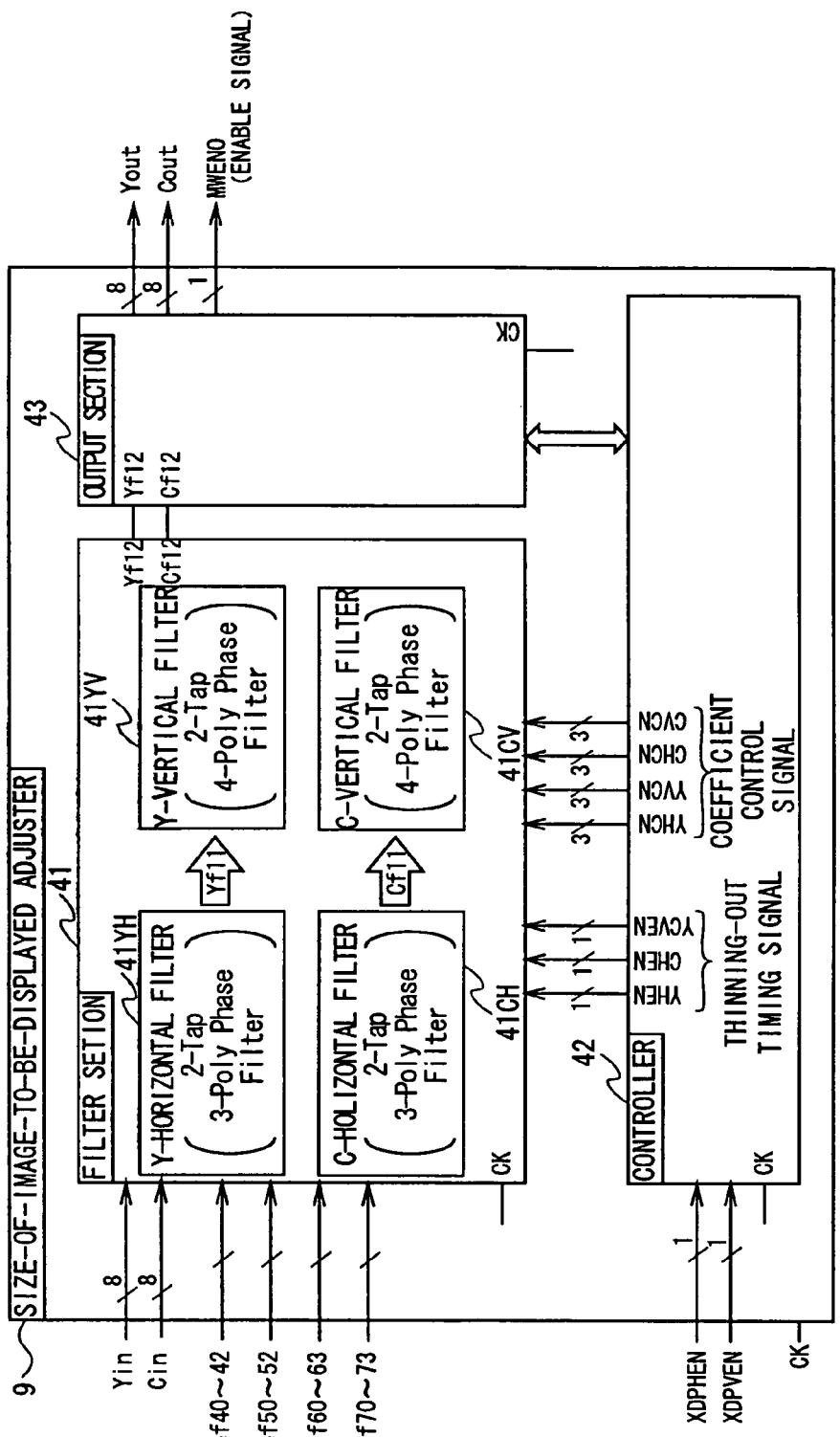
FIG. 21 is a block diagram showing the circuit structure of the size-of-image-to-be-displayed adjuster according to the present invention.

As shown in FIG. 21, the size-of-image-to-be-displayed adjuster 9 is composed of a filter section 41, a controller 42, and an output section 43. The filter section 41 receives input data Yin as luminance data and input data Cin (CB and CR) as color different data, which are supplied from the DSP5.

Then, it performs filtering in a horizontal direction on the input data Yin through a Y-horizontal filter 41YH to produce data Yf11, and then performs filtering in a vertical direction on the produced data through a Y-vertical filter 41YV to produce data Yf12 which is then supplied to the output section 43.

The input data Yin is data with 1360×1020 picture elements, and the data Yf11 is data which has been reduced at a ratio regulated by a filter coefficient and thinning-out timing.

Further, the filter section 41 performs filtering in a horizontal direction on the input data Cin through a C-horizontal filter 41CH to produce data Cf11, and performs filtering in a vertical direction on the produced data through a C-vertical filter 41CV to produce data Cf12 which is then supplied to the output section 43.

The input data Cin is data for two channels comprised of CB data with 680×1020 picture elements and CR data with 680×1020 picture elements. The data Cf12 is data for two channels which has been reduced at a predetermined ratio.

In the case of the linear interpolation, as described above, a filter can be comprised of two taps, so the Y-horizontal filter 41YH, the Y-vertical filter 41YV, the C-horizontal filter 41CH, and the C-vertical filter 41CV each has two taps.

Further, in this embodiment, the Y-horizontal filter 41YH and the C-horizontal filter 41CH each is a 3-poly phase filter, and the Y-vertical filter 41YV and the C-vertical filter 41CV each is a 4-poly phase filter. The coef 40–42 and the coef 50–52, with eight bits, are supplied in common as multiplication coefficients to the Y-horizontal filter 41YH and the C-horizontal filter 41CH to be set in an internal register which is described later. In addition, the coef 60–63 and the coef 70–73, with eight bits, are supplied in common as multiplication coefficients to the Y-vertical filter 41YV and the C-vertical filter 41CV to be set to an internal register which is described later.

The output section 43 performs processing on data Yf12 and Cf12, linearly-interpolated in the filter section 41, to supply them to the following video RAM controller 11. Then the resultant is supplied to the video RAM controller 11 as output data Yout and Cout together with the memory write enable signal MWENO, so that the output data Yout and Cout are written in the video RAM 12.

The controller 42 outputs a signal which regulates various kinds of timing to the filter section 41 and the output section 43. In actual, the controller 42 produces various kinds of signals based on a horizontal effect video period signal XDPHEN and a vertical effect video period signal XDPVEN from the DSP 5. That is, the controller 42 makes the filter section 41 and the output section 43 drive using respective timing signals within a period of time when the horizontal effect video period signal XDPHEN and the vertical effect video period signal XDPVEN are both "L" levels.

Here, as timing signals to be supplied to the filter section 41, thinning-out timing signals YHEN, CHEN and YCVEN for N/M conversion and coefficient control signals (coefficient address) YHCN, YVCN, CHCN and CVCN for time-varying coefficients are used.

Sequentially, the circuit constructions of the Y-horizontal filter 41YH, the Y-vertical filter 41YV, the C-horizontal filter 41CH and the C-vertical filter 41CV will be described one by one with reference to FIGS. 22–25. Note that, input data Yin and Cin from the DSP 5 are as shown in FIG. 13.

Figure 22:
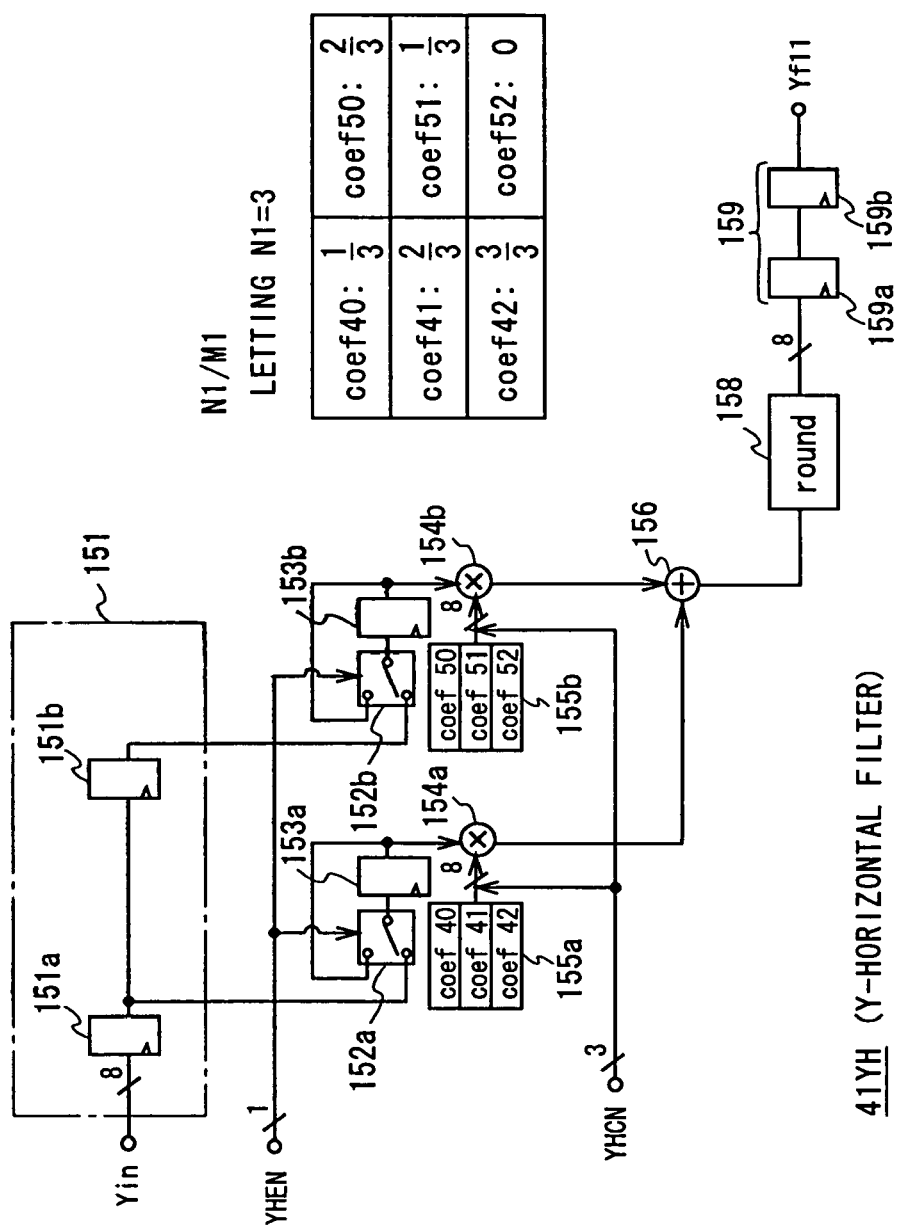
FIG. 22 is a block diagram showing the circuit structure of the Y-horizontal filter of the size-of-image-to-be-displayed adjuster according to the present invention.

As shown in FIG. 22, the Y-horizontal filter 41YH has a shift register 151 composed of latch circuits 151$a$ and 151$b$. Each latch circuit 151$a$, 151$b$ delays input data Yin for one clock timing, so that data by two taps is obtained. The obtained data is supplied to the latch circuits 153$a$ and 153$b$ via the switches 152$a$ and 152$b$.

The latch circuits 153$a$ and 153$b$ supply latch output data to the multipliers 154$a$ and 154$b$. In this time, switches 152$a$ and 152$b$ are switched by the thinning-out timing signal YHEN, so that through this operation, the latch output data from the latch circuits 153$a$ and 153$b$ becomes the condition in which data has been thinned out, similarly to the Y-horizontal filter 31YH of the size-of-image-to-be-recorded adjuster 10 described above.

On the other hand, the coef 40–42 and the coef 50–52, with eight bits, are set to the registers 155$a$ and 155$b$ as multiplication coefficients, respectively. The multiplication coefficients to be supplied to the multipliers 154$a$ and 154$b$ are changed according to the coefficient control signal (coefficient address) YHCN which is supplied from the controller 42. This is basically a similar operation to that of the Y-horizontal filter 31YH of the aforementioned size-of-image-to-be-recorded adjuster 10.

The multipliers 154$a$ and 154$b$ multiply latch output data of the latch circuits 153$a$ and 153$b$ by the multiplication coefficients coef 40–42, coef 50–52 which are sequentially changed and supplied, respectively. Then, the outputs of the multipliers 154$a$ and 154$b$ are added by the adder 156. The resultant, after being subjected to the round-off processing by a round-off processor 158, is output as data Yf11 through a timing adjuster 159 composed of latch circuits 159$a$ and 159$b$. This data Yf11 is data which has been subjected to the image size adjustment in a horizontal direction, and is supplied to the following Y-vertical filter 41YV.

When the linear interpolation is performed, it is considered that processing is executed at the conversion ratio of N1/M1 in a horizontal direction. Letting N1=3, three multiplication coefficients are provided for each register as described above, and a pair of coefficients for each tap has a relation between a coefficient K and a coefficient (1−K). That is, as shown in a table of FIG. 22, in the case of setting the coefficient K to the multiplication coefficient coef 40=⅓, the coefficient (1−K) is equal to coef 50=⅔. Further, in the case offsetting the coefficient K to the coef 41=⅔, the coefficient (1−K) is equal to coef 51=⅓. Furthermore, in the case of setting the coefficient K to the coef 42=3/3, the coefficient (1−K) is equal to coef 52=0. Therefore, the filtering by a linear interpolation described in FIGS. 1 and 2 is realized.

Figure 24:
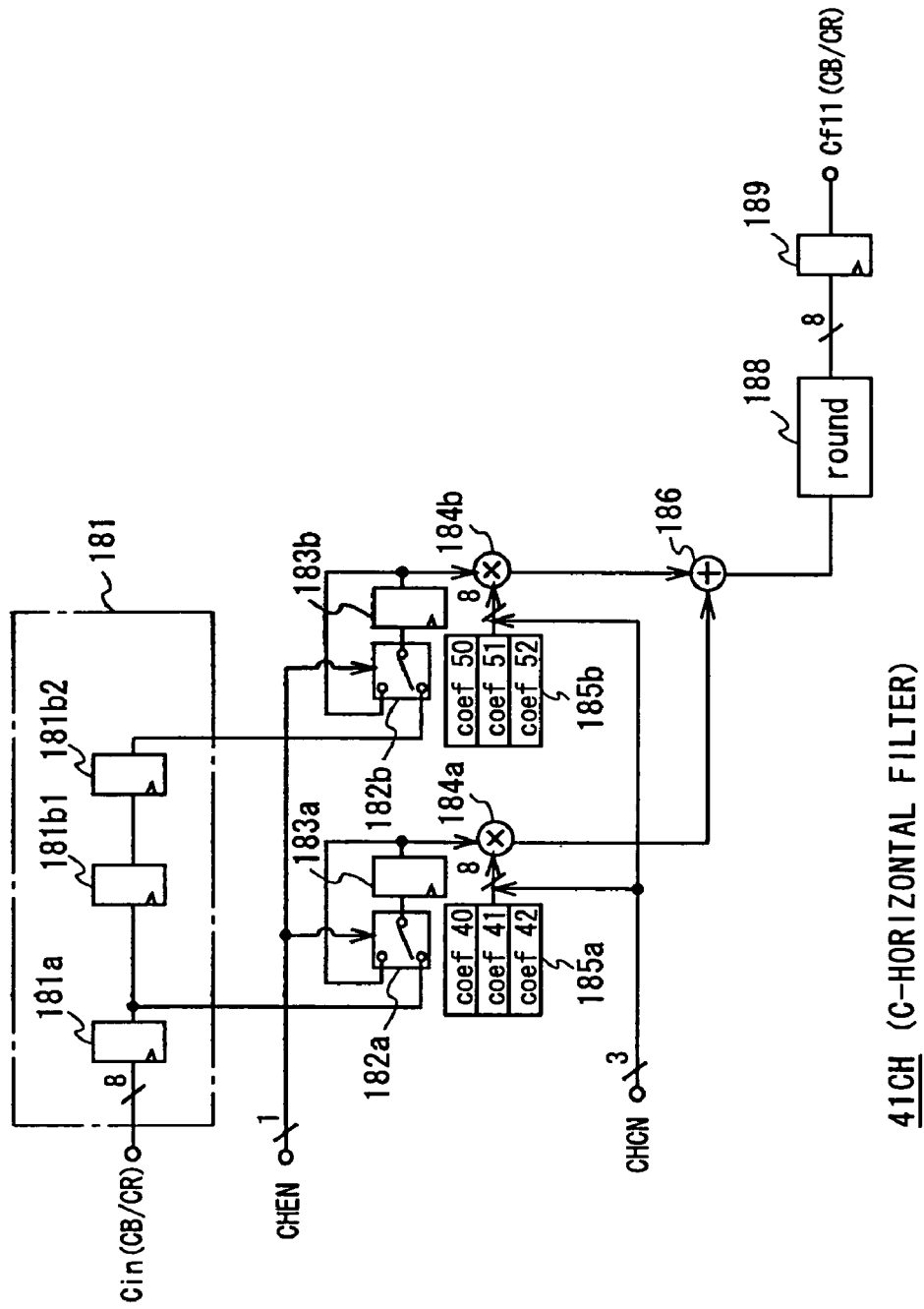
FIG. 24 is a block diagram showing the circuit structure of the C-horizontal filter of the size-of-image-to-be-displayed adjuster according to the present invention.

As shown in FIG. 24, the C-horizontal filter 41CH has a shift register 181 composed of latch circuits 181$a$, 181$b$1, and 181$b$2. The latch circuit 181$a$ performs a delay for one clock timing on input data Cin, and the latch circuits 181$b$1 and 181$bs$ perform a delay for two-clock timing. As a result, data by two taps is obtained and is supplied to latch circuits 183$a$ and 183$b$ via switches 182$a$ and 182$b$.

In this case, data CB and CR are ones which have been subjected to the two-clock timing delay in a pair, similarly to the C-horizontal filter 31CH of the size-of-image-to-be-recorded adjuster 10 described above.

The latch circuits 183$a$ and 183$b$ supply latch output data to the multipliers 184$a$ and 184$b$. Here, the switches 182$a$ and 182$b$ are switched by the thinning-out timing signal CHEN, so the latch output data of the latch circuits 183$a$ and 183$b$ are in a condition where data has been thinned out, similarly to the C-horizontal filter 31CH of the size-of-image-to-be-recorded adjuster 10 described above.

On the other hand, the coef 40–42, the coef 50–52, with eight bits, are set as multiplication coefficients to the registers 185$a$ and 185$b$, similarly to the aforementioned Y-horizontal filter 41YH. The multiplication coefficients to be supplied to the multipliers 184a and 184b are changed according to the coefficient control signal (coefficient address) CHCN which is supplied from the controller 42.

In this size-of-image-to-be-displayed adjuster 9, letting N1=3 in the case where processing is performed at a conversion rate of N1/M1 in a horizontal direction, values of the multiplication coefficients coef 40–42 and coef 50–52 are as shown in FIG. 22.

The multipliers 184a and 184b multiply the latch output data of the latch circuits 183a and 183b by the respective multiplication coefficients coef 40–42 and coef 50–52 sequentially changed and supplied. Then, the outputs of the multipliers 184a and 184b are added by an adder 186. The resultant is subjected to the round-off processing at a round-off processor 188 and then, is output as data Cf11 through the latch circuit 189. The data Cf11 is data which has been subjected to the image size adjustment in a horizontal direction by the linear interpolation, and this data is to be supplied to the following C-horizontal filter 41CV.

Figure 23:
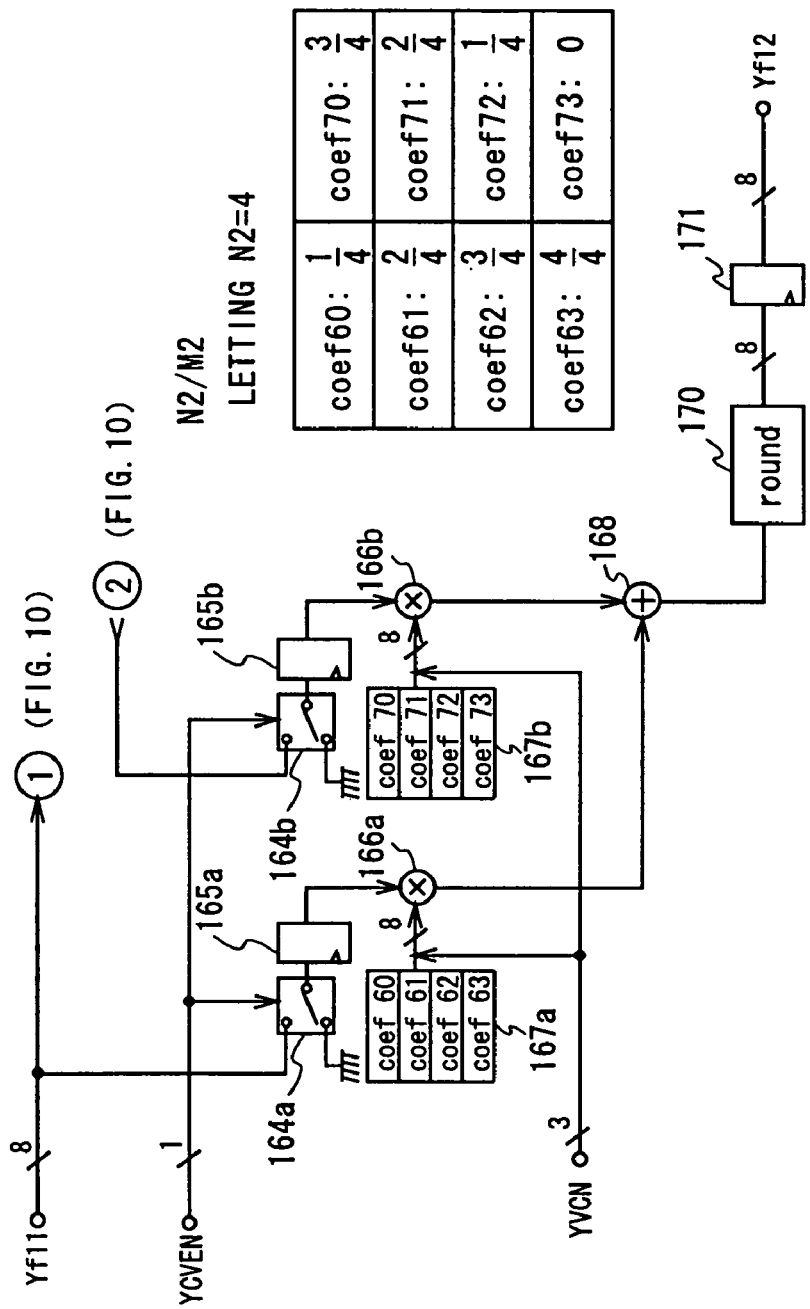
FIG. 23 is a block diagram showing the circuit structure of the Y-vertical filter of the size-of-image-to-be-displayed adjuster according to the present invention.

Therefore, the data Yf11 outputted from the Y-horizontal filter 41YH is subjected to filtering in a vertical direction through the Y-vertical filter 41YV shown in FIG. 23. And the data Cf11 outputted from the C-horizontal filter 41CH is subjected to filtering in a vertical direction through the C-horizontal filter 41CV shown in FIG. 25.

The Y-vertical filter 41YV has two taps, but does not have a line memory for a delay for one line in the case. The switches 60a and 60b of Y-vertical filter 31YV shown in FIG. 10 described above are switched to a TP terminal when the size-of-image-to-be-displayed adjuster 9 performs processing.

That is, while the size-of-image-to-be-displayed adjuster 9 performs processing, the data Yf11 is supplied to the line memory 62 in the Y-vertical filter 31YV in the size-of-image-to-be-recorded adjuster 10 through a path ① shown in FIGS. 23, and the output of the line memory 62 returns back through a path ②. That is, the line memory 62 is used in common.

Therefore, the Y-vertical filter 41YV in FIG. 23 obtains data by two taps which are a delay signal by the line memory 62 and a non-delay signal, and supplies these to the latch circuits 165a and 165b via the switches 164a and 164b, respectively. The latch circuits 165a and 165b supply their latch output data to the multipliers 166a and 166b.

Here, the switches 164a and 164b are switched by a thinning-out timing signal YCVEN, and latch output data of the latch circuits 165a and 165b are in the conditions in which data has been thinned out every line.

The coef 60–63 and the coef 70–73, with eight bits, are set as multiplication coefficients to the registers 167a and 167b. The multiplication coefficients to be supplied to the multipliers 166a and 166b are changed every required line(s) according to the coefficient control signal (coefficient address) YVCN which is supplied from the controller 42.

The multipliers 166a and 166b multiply the latch output data of the latch circuits 165a and 165b by the respective multiplication coefficients coef 60–63, coef 70—73 sequentially changed and supplied. Then, the outputs of the multipliers 166a and 166b are added by an adder 169, and the resultant is subjected to the round-off processing by the round-off processor 170 and then output as data Yf12 through the latch circuit 171. This data Yf12 is data which has been subjected to the image size adjustment in a vertical direction in addition to a horizontal direction.

When the linear interpolation is executed and when processing is performed at a conversion ratio of N2/M2 in a vertical direction, in the case of N2=4, four multiplication coefficients are provided for each register as described above. A pair of coefficients for each tap has a relation between a coefficient K and a coefficient (1−K). That is, as shown in a table of FIG. 23, the coefficient (1−K) becomes coef 70=¾ in the case of setting the coefficient K to the multiplication coefficient 60=¼, the coefficient (1−K) becomes coef 71=²⁄₄ in the case of setting the coefficient K to the multiplication coefficient 61=²⁄₄, and the coefficient (1−K) becomes coef 72=¼ in the case of setting the coefficient K to the multiplication coefficient 62=¾. Furthermore, the coefficient (1−K) becomes coef 73=0 in the case of setting the coefficient K to the multiplication coefficient 63=⁴⁄₄. Therefore, the filtering processing by the linear interpolation described with reference to FIGS. 1 and 2 is realized.

Figure 25:
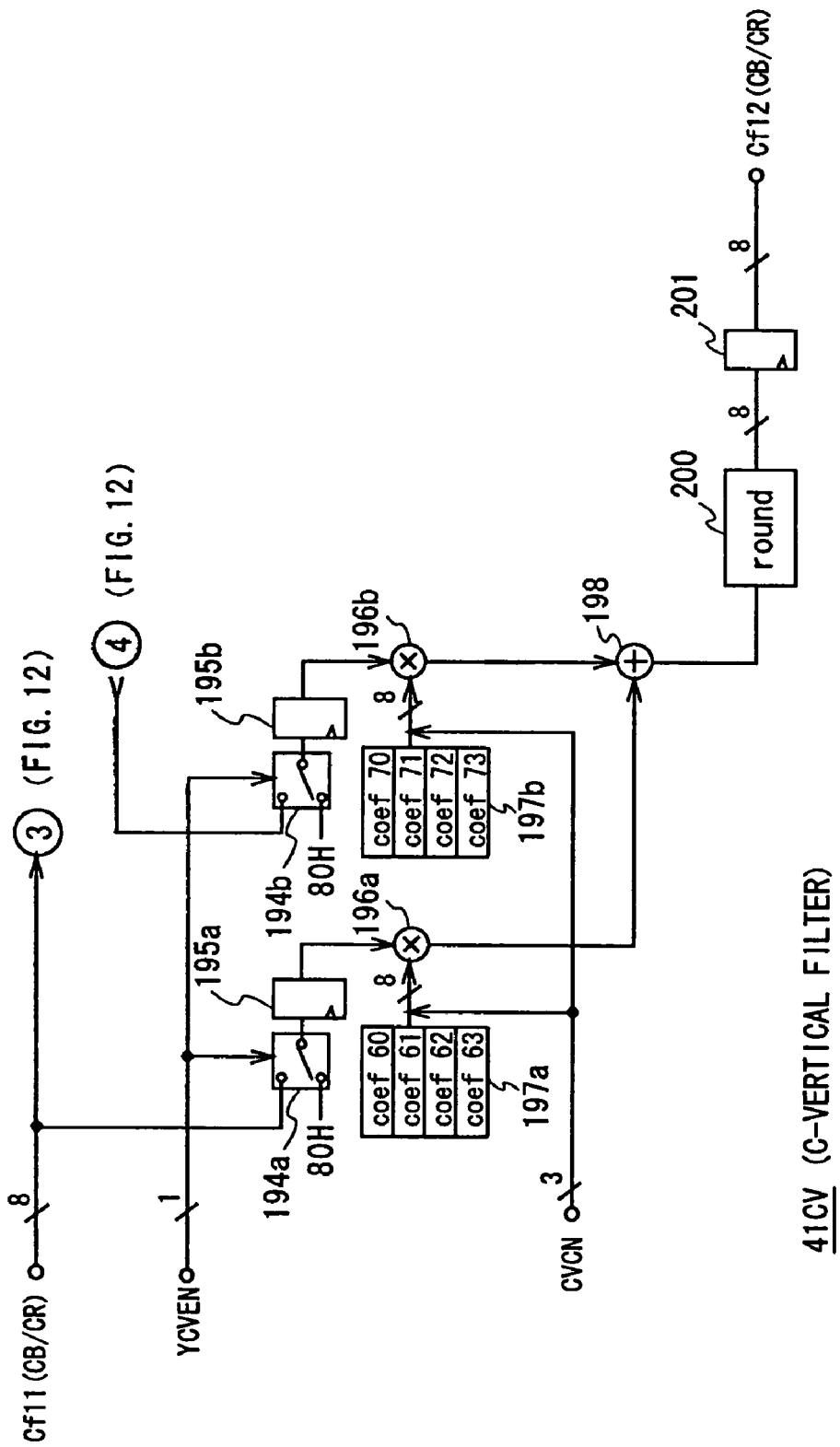
FIG. 25 is a block diagram showing the circuit structure of the C-vertical filter of the size-of-image-to-be-displayed adjuster according to the present invention.

Next, in this case, also, the C-vertical filter 41CV has two taps as shown in FIG. 25, but does not have a line memory for a delay for one line. While the size-of-image-to-be-displayed adjuster 9 performs processing, data Cf11 is supplied to the line memory 92 in the C-vertical filter 31CV in the size-of-image-to-be-recorded 10 through a path ③ and outputs of the line memory 92 return back through a path ④, via the switches 90a and 90b in the C-vertical filter 31CV shown in FIG. 12 described above. That is, the line memory 92 is used in common.

As a result, the C-vertical filter 41CV in FIG. 25 obtains data by two taps which are a delay signal by the line memory 92 and a non-delay signal, and supplies these the latch circuits 195a and 195b via the switches 194a and 194b, respectively. The latch circuits 195a and 195b supply their latch output data to the multipliers 196a and 196b.

Here, the switches 194a and 194b are switched by a thinning-out timing signal YCVEN, so the latch output data of the latch circuits 195a and 195b are in the condition where data has been thinned out every line.

The multiplication coefficients coef 60–63 and coef 70–73, with eight bits, which are the same value as those of the registers 167a and 167b in FIG. 23, are set to the registers 197a and 197b. The multiplication coefficients to be supplied to the multipliers 196a and 196b are changed according to the coefficient control signal (coefficient address) CVCN which is supplied from the controller 42.

The multipliers 196a and 196b multiply latch output data of the latch circuits 195a and 195b by the respective multiplication coefficients coef 60–63 and coef 70–73 sequentially changed and supplied. The outputs of the multipliers 196a and 196b are added by an adder 198 and the resultant is subjected to the round-off processing by the round-off processor 200 and then is output as data Cf12 through the latch circuit 201. This data Cf12 is data in which the image size adjustment by a linear interpolation has been performed in a vertical direction in addition to a horizontal direction.

The data Yf12 and Cf12, each of which the image size has been adjusted by the filter section 41 as described above, are subjected to predetermined processing at the output section 43 and are output to the following video RAM controller 11.

The size-of-image-to-be-displayed adjuster 9 performs the image size adjustment by the linear interpolation of the filter having the aforementioned construction. However, the number of taps in a filter may be two taps if a conversion ratio is changed in the linear interpolation. In addition, the size-of-image-to-be-displayed adjuster 9 may change multiplication coefficients according to a conversion ratio to be used. In this case, also the multiplication coefficients can be set easily as coefficients K and (1−K).

That is, in the size-of-image-to-be-displayed adjuster 9, image quality may get worse depending on a conversion ratio because of the linear interpolation. However, this is not a bad point for image data to be simply displayed. On the contrary, the size-of-image-to-be-displayed adjuster 9 can control a conversion ratio flexibility, so that it can easily cope with the mechanism of a display device and further with various requirements such as the reduction display and the enlargement display. Thus, it is suitable for the image size adjustment of data to be displayed.

Further, in the size-of-image-to-be-displayed adjuster 9, the Y-vertical filter 41YV and the C-vertical filter 41CV are provided with the line memories 62 and 92 which are used in the Y-vertical filter 31YV and C-vertical filter 31CV in the size-of-image-to-be-recorded adjuster 10, so that a line memory which makes the circuit size comparatively large is not required and the circuit is minimized. In this way, the digital still camera 1 is provided with the size-of-image-to-be-recorded adjuster 10, which performs a curve interpolation for suppressing the deterioration of image quality, and the size-of-image-to-be-displayed adjuster 9, which performs a linear interpolation, with a simple construction, so that it can keep the enlargement of circuit size at a minimum.

Note that, in the aforementioned embodiment, the case where image data is reduced at a conversion ratio of 8/17 in the size-of-image-to-be-recorded adjuster 10 has been described. However, the present invention is not limited thereto and other various conversion ratios can be set.

Further, in the aforementioned embodiment, the size-of-image-to-be-displayed adjuster 9 and the size-of-image-to-be-recorded adjuster 10 have the circuit constructions as shown in FIGS. 9–12 and FIGS. 21–24. However, the present invention is not limited thereto and the size-of-image-to-be-displayed adjuster 9 and the size-of-image-to-be-recorded adjuster 10 may be constructed with other various circuit constructions.

INDUSTRIAL APPLICABILITY

The imaging device according to the present invention is applied to an electronic camera which takes in image data with photoelectric converting elements, records this in a recording medium, and displays this on a display unit.

What is claimed is:

1. An imaging device for receiving an input image and producing two size-adjusted output images, the device comprising:
    photographing means for capturing the input image and outputting the captured input image as image data;
    first adjusting means for performing image size adjustment using a linear interpolation on the image data to produce a first output image that is displayed and outputted;
    second adjusting means for performing image size adjustment using a curve interpolation on the image data to produce a second output image that is recorded on a recording medium;
    display data output means for displaying the first output image; and
    recording means for recording the second output image in said recording medium,
    wherein the image size adjustment using a linear interpolation allows the first adjustment means to be simply configured to cope with changes in display operations of the display data output means, and
    wherein the image size adjustment using a curve interpolation allows the second adjustment means to substantially reduce image degradation so that the second output image can be recorded with high quality.

2. The image device according to claim 1, wherein
said first adjusting means and said second adjusting means use a line memory, which is used for the image size adjustment using the linear interpolation and the image size adjustment using the curve interpolation, in common.

3. The image device according to claim 1, wherein
said second adjusting means, in the case of interpolating said image data into N/M (M and N are mutually prime and positive numbers), performs filtering having a characteristic in which n/M (n=1,2, . . . ,M−1), k/N (k=1,2, . . . ,N−1) on a frequency axis are zero, so as to execute the curve interpolation.

4. The image device according to claim 1, wherein
said display operations of the display data output means include an image size conversion ratio adjustment.

5. The image device according to claim 1, wherein
said display operations of the display data output means include image magnification.

6. The image device according to claim 1, wherein
said display operations of the display data output means include image reduction.

7. The image device according to claim 1, wherein
the display data output means includes a viewfinder.

8. The image device according to claim 1, wherein
the display data output means includes a monitor.

* * * * *